US009045209B2

(12) United States Patent
Zeren et al.

(10) Patent No.: US 9,045,209 B2
(45) Date of Patent: Jun. 2, 2015

(54) ACTIVE VOLUME ENERGY LEVEL LARGE SCALE SUB-SEA ENERGY FLUIDS STORAGE METHODS AND APPARATUS FOR POWER GENERATION AND INTEGRATION OF RENEWABLE ENERGY SOURCES

(71) Applicants: Fevzi Zeren, New Providence, NJ (US); Zekeriye Konukoglu, Bursa (TR)

(72) Inventors: Fevzi Zeren, New Providence, NJ (US); Zekeriye Konukoglu, Bursa (TR)

(73) Assignees: Sanko Tekstil Isletmeleri Sanayi VE Ticaret A.S. (TR); Fevzi Zeren, New Providence, NJ (US); Zekeriye Konukoglu (TR)

( * ) Notice: Subject to any disclaimer, the term of this patent is extended or adjusted under 35 U.S.C. 154(b) by 80 days.

(21) Appl. No.: 13/802,912

(22) Filed: Mar. 14, 2013

(65) Prior Publication Data

US 2014/0261132 A1    Sep. 18, 2014

(51) Int. Cl.
*B65D 88/78*    (2006.01)
*B63G 8/00*    (2006.01)
(Continued)

(52) U.S. Cl.
CPC . *B63G 8/001* (2013.01); *F04F 5/00* (2013.01); *C01B 3/08* (2013.01); *C02F 1/22* (2013.01); *B65D 88/78* (2013.01); *C01F 1/00* (2013.01); *F17C 1/007* (2013.01); *F17C 5/06* (2013.01);
(Continued)

(58) Field of Classification Search
CPC .................................. B65D 88/78; B63G 8/42
USPC ......................................................... 114/257
See application file for complete search history.

(56) References Cited

U.S. PATENT DOCUMENTS 3,456,802 A * 7/1969 Cole ........................ 210/170.11
3,727,418 A    4/1973 Glazier
(Continued)

FOREIGN PATENT DOCUMENTS

CA    2 467 287 A1    11/2005
CN    101200319    4/2011
(Continued)

OTHER PUBLICATIONS

International Search Report of PCT/US2013/051856, mailed on Oct. 9, 2013, 5 pages.
(Continued)

*Primary Examiner* — Lars A Olson
*Assistant Examiner* — Jovon Hayes
(74) *Attorney, Agent, or Firm* — Finnegan, Henderson, Farabow, Garrett & Dunner, LLP

(57) ABSTRACT

Systems and methods for storing energy in gaseous form in submerged thin-walled tanks are secured to the ocean or lake floor but are open to the water at the tank bottoms and are configured to be filled with gas while submerged.
A conduit operatively connected to the tanks provides flow from a surface source of an energy-containing gas to the tank interiors. Surface or subsurface pumping apparatus which may include piston-less pressure cylinders or have leveraged pistons provide a preselected flow rate of the energy-containing gas into the containment structure interior against a back pressure essentially equal to the static pressure of the body of water at the location of the tank to displace an equivalent volume of water through the open bottom. The conduit can be configured to allow heat transfer to vaporize liquefied gas prior to storage. Hydrogen gas can be generated and stored within the tank using Aluminum activated with Galinstan.

31 Claims, 18 Drawing Sheets

(51) Int. Cl.
| | |
|---|---|
| *F04F 5/00* | (2006.01) |
| *C01B 3/08* | (2006.01) |
| *C01F 1/00* | (2006.01) |
| *F17C 1/00* | (2006.01) |
| *F17C 5/06* | (2006.01) |
| *F17C 9/04* | (2006.01) |
| *F17C 13/02* | (2006.01) |
| *F17C 13/08* | (2006.01) |
| *C02F 1/22* | (2006.01) |
| *C02F 103/08* | (2006.01) |

(52) U.S. Cl.
CPC ............... F17C 9/04 (2013.01); F17C 13/021 (2013.01); F17C 13/081 (2013.01); *C02F 2103/08* (2013.01); *F17C 2201/0109* (2013.01); *F17C 2201/0138* (2013.01); *F17C 2201/0157* (2013.01); *F17C 2201/0185* (2013.01); *F17C 2201/032* (2013.01); *F17C 2201/035* (2013.01); *F17C 2201/052* (2013.01); *F17C 2201/054* (2013.01); *F17C 2203/0617* (2013.01); *F17C 2205/0126* (2013.01); *F17C 2205/0142* (2013.01); *F17C 2205/0149* (2013.01); *F17C 2205/0184* (2013.01); *F17C 2205/0326* (2013.01); *F17C 2205/0355* (2013.01); *F17C 2221/011* (2013.01); *F17C 2221/012* (2013.01); *F17C 2221/031* (2013.01); *F17C 2221/033* (2013.01); *F17C 2221/035* (2013.01); *F17C 2223/0123* (2013.01); *F17C 2223/0153* (2013.01); *F17C 2223/0161* (2013.01); *F17C 2223/0169* (2013.01); *F17C 2223/0192* (2013.01); *F17C 2223/033* (2013.01); *F17C 2223/035* (2013.01); *F17C 2225/0123* (2013.01); *F17C 2225/035* (2013.01); *F17C 2227/0114* (2013.01); *F17C 2227/0142* (2013.01); *F17C 2227/0157* (2013.01); *F17C 2227/0164* (2013.01); *F17C 2227/0192* (2013.01); *F17C 2227/0318* (2013.01); *F17C 2227/0327* (2013.01); *F17C 2227/033* (2013.01); *F17C 2227/039* (2013.01); *F17C 2227/0395* (2013.01); *F17C 2250/0413* (2013.01); *F17C 2250/0491* (2013.01); *F17C 2250/075* (2013.01); *F17C 2260/046* (2013.01); *F17C 2265/05* (2013.01); *F17C 2265/07* (2013.01); *F17C 2270/0123* (2013.01); *F17C 2270/0128* (2013.01); *F17C 2270/0136* (2013.01); *F17C 2270/0152* (2013.01); *F17C 2270/0581* (2013.01); *Y02E 60/321* (2013.01); *Y02E 60/322* (2013.01); *Y02E 60/36* (2013.01)

(56) References Cited

U.S. PATENT DOCUMENTS

| | | | |
|---|---|---|---|
| 4,209,271 | A | 6/1980 | McCabe |
| 4,619,593 | A | 10/1986 | Molnar |
| 6,666,024 | B1 * | 12/2003 | Moskal ................ 60/641.7 |
| 6,863,474 | B2 * | 3/2005 | Webster et al. ............ 405/210 |
| 7,911,073 | B2 * | 3/2011 | Smith ................ 290/53 |
| 2002/0159892 | A1 * | 10/2002 | Zaptcioglu ................ 417/53 |
| 2008/0190849 | A1 * | 8/2008 | Vuong ................ 210/652 |
| 2009/0140523 | A1 * | 6/2009 | DeAngeles ................ 290/43 |
| 2010/0276935 | A1 * | 11/2010 | Dehlsen et al. ............ 290/54 |
| 2011/0253558 | A1 | 10/2011 | Lewis |

FOREIGN PATENT DOCUMENTS

| | | |
|---|---|---|
| DE | 743 163 | 12/1943 |
| DE | 24 47 246 A1 | 4/1976 |
| DE | 10211788 | 10/2003 |
| EP | 055 330 | 7/1982 |
| EP | 0968755 | 1/2000 |
| FR | 2 975 841 | 11/2012 |
| KR | 20020072315 | 9/2002 |
| WO | WO94/12267 | 6/1994 |
| WO | WO 2011/084164 A1 | 7/2011 |
| WO | WO 2011/159011 A1 | 12/2011 |
| WO | WO2012/025656 | 3/2012 |
| WO | WO2012/131621 | 10/2012 |
| WO | WO 2012131621 A2 * | 10/2012 |

OTHER PUBLICATIONS

Written Opinion of PCT/US2013/051856, mailed on Oct. 9, 2013, 7 pages.
International Search Report of PCT/US2013/044085, mailed May 26, 2014, 8 pages.
Written Opinion of PCT/US2013/044085, mailed May 26, 2014, 9 pages.

\* cited by examiner

ACTIVE VOLUME ENERGY LEVEL LARGE SCALE SUB-SEA ENERGY FLUIDS STORAGE METHODS AND APPARATUS FOR POWER GENERATION AND INTEGRATION OF RENEWABLE ENERGY SOURCES

FIELD OF THE INVENTION

This invention relates to energy storage systems and methods. In particular, this invention relates to underwater storage of energy-containing fluids, especially in gaseous form.

BACKGROUND OF THE INVENTION

As is well known, world energy consumption is increasing at an alarming rate while the supply side of the fossil fuel has limited reserves. In addition to fast depletion of the projected fossil fuel reserves (petroleum, gas and coal), their irreversible damage to the environment and atmosphere (greenhouse gas) prompted exploration the environmentally friendly, alternative energy sources. Since mid the 1970, many studies were undertaken by academia, the private sector and governments around the world looking for environmentally friendly alternative energy sources. From these studies, natural resources like the wind, solar, ocean waves, currents and biomass energy-generating technologies emerged. Especially, wind power turbines became the most accepted energy source and is growing at a rate of 20% for year over worldwide. Even with the large advancement in these technologies, the total electric generation from these sources, excluding hydroelectricity, is still less than 3% of the world total energy consumption today.

While the potential from natural resources including solar and wind are much higher than the world power consumption, harvesting the useful energy from these sources in a steady way is very challenging. However, required technologies, at least for the wind and the solar farms, are well developed, their prices are coming down, and utility scale power plants are in operation. With all of these improvements, the biggest problem is that these sources are not predictable. For example, in general, the power generation from a wind farm dies off during the daytime, especially during the afternoon hours when electricity is needed the most. However, it picks up or reaches its maximum during night hours when electricity is needed the least. Similarly, solar or ocean wave based energy generation process is not predictable either. Battery based storage technologies are still in development stage and they are too expensive in addition to their short power discharge life. Underground compressed air energy storage systems (CAES, only two systems in operation) are reliable but they are also very costly to construct. As seen from this discussion, new, innovative, safe, efficient and inexpensive energy storage facilities for gas and liquids are urgently needed. This is necessary for not only for the survivability of renewable energy sources but also for them to be considered as serious alternatives to fossil fuels. Considering these problems, the deep water storage systems apparatus, may help to solve these challenging issues of renewable energy of sources, in addition to providing the environmental and human safety benefits.

The existing land based energy storage tanks used for storing compressed energy gas or liquids cannot be a comprehensive and long term solution for the energy storage problems, due to high risks to the surroundings (live-stock, hazard materials, fire). They also have technical limitations regarding the size of the tanks. These become very critical issues, especially when a power generation system requires large storage tanks for an optimum output from the generation plant. As is well known, internally pressurized larger tanks require high strength construction materials and larger wall thicknesses. Therefore, for safety reasons, and including many other factors, there is a limit to how big a tank can be constructed for given tank material(s) and internal pressure. These and many other problems associated with energy fluids storage are eliminated and/or at least minimized by deep water storage systems discussed in this invention.

Before going into the details of the present invention, it would be helpful to discuss some of the previous works and some parameters of a deep ocean that can be utilized for designing a novel sub-sea energy storage system. In the past, many theoretical studies were proposed to generate energy within sub-sea based systems. At first, these prior energy generation systems look conceptually very attractive. However, when you analyze them in detail, these prior power generation systems have many shortfalls. The most common problems are violation of the law of physics. Also, they may be impractical or require large capital investments and/or are based on unrealistic conditions. The required conditions cannot be easily met to build or to operate these sub-sea storage power generation systems. Some of them carry very fresh ideas while the overall system performance is either so poor or falls into the perpetual motion machine category (i.e., violates the first law of thermodynamics). For example, in the previous art (U.S. Pat. No. 7,911,073 B2), deep ocean water runs through water turbines located at the entrance of an empty water collecting tank secured at the sea floor while generating useful electric energy. This is fine, but to put the entire system in a steady state operation, those water collecting tanks have to be discharged into the ocean against the same static pressure that run the turbines in the first place. Discharging those tanks will not require less pumping energy than the turbines output. Similarly, in the previous art (U.S. Patent Publication No. 2000/0159892 A1), thermal energy is generated by allowing the deep ocean water to compress a working gas contained in a cylinder similar to a Pascal hydraulic system. Again, the amount of thermal energy generated cannot be greater than the energy needed to pump the water out or to empty the tank. In these examples and others, too often the inventors are not clear about running their systems in a steady state mode while still producing positive useful energy.

In order to give a better understanding of our approach to the large volume underwater energy fluids storage system, it is necessary to discuss the basic governing laws and main factors associated with deep ocean or lake waters. First of all, in a large body of water, there is a need for a potential difference between two points in order to generate energy or to compress a fluid(s). This potential could be differences in temperature (between two points), density, or pressure (weight per unit area) The higher the potential differences, the greater the chance of producing energy or some useful work. Regardless of the weather conditions and the location, the largest potential difference in deep water is the static pressure. It is a linear function of the depth. Having large potential differences in the body of water is the first necessary requirement. However, it is by itself not sufficient to generate energy. In order to produce a useful result (i.e., produce energy or do work), there is a need to put the fluid in motion between two points having difference in potentials. How to utilize this given potential difference in flowing water is dependent upon the method and the devices used in the system. If the system is steady flow or cyclical, useful energy in the form of electricity, thermal or mechanical works type energy per unit time (i.e., power) is produced. If the system is not cyclical, it is possible to produce energy one time only. In a continuous cyclical process, the net useful energy is determined by subtracting the input energy from the total output over a completed cycle of the system.

Large volume energy storage is the heart of the present invention. It is basically a novel, deep-water, stationary energy storage tank, which can also be utilized for high pressure energy generation such as H2 and O2 gases. This invention may use steady flow equipment such as pumps, compressors, heat exchangers and gas or water turbines at various stages of the cycle during energy storage. Hence, the basic equations of these devices are now discussed in order to provide a broader understanding of this invention.

When we apply the conservation of energy principle, or the first law of thermodynamics, over these steady-flow devices between inlet and exit (two port system, pump, compressor, turbines, etc.), the simplified version of the energy equation becomes as $Q'-'=M'(h2-h1)$. This equation includes heat rate input ($Q'$) power output ($W'$), mass flow rate ($M'$) and the enthalpies (h2, h1) of the working substance at exit and inlet states. This is a simple steady flow energy equation and it is sufficient to analyze the energy balance of various devices used in the present invention. For the most part, during a compression or expansion process across pumps, compressors or turbines, the heat loss or gain by the substance can be neglected (except for the heat exchangers). What is left is the power output in terms of enthalpy changes. In this equation, if h2 is greater than h1, then the device is either a pump or a compressor; otherwise, it is a turbine (gas or liquid). As seen from this equation, it is possible to generate electric energy by allowing deep ocean water through water turbines at the entrance of an empty (initially) sea floor-based storage or receiving tank(s). Again, unlike a hydroelectric dam in which the water is running down after the turbines due to the lower elevation (gravity), here at the bottom of the ocean, once the tanks are filled, they need to be emptied against the same potential which caused the electric generation at the first place. The energy required to empty the tanks by pumps will not be less than the turbine outputs, although the power can be different due to the time frame. This issue, too, is often either skipped or not clearly discussed in many of the previous arts. This type of energy generating system must satisfy the first law of thermodynamics. Otherwise it falls into a perpetual machine category.

In the present invention, the sub-sea storage tank system is filled with energy containing fluids from a location at or near the surface of the large body of water. Using pumps, compressors, multi-phase pumps or hydraulic based compression devices, the fluids in the form of liquids or gases, including air, from a floating platform, a tanker ship or an offshore facility are transferred into the sub-sea storage tanks. As energy fluid occupies the upper region of the tank, it also replaces (pushes out) the sub-sea high pressure water which is already inside the tanks. The tank bottoms are either completely open or partially open, or they have large ports to allow the surrounding water to flow in and out of the tanks during the discharging and charging processes respectively. During the charging process, the compressors or pumps will require large power inputs regardless of the sources of the power whether a free or inexpensive energy from renewables during off peak hours or a direct pull from the utility grids. Therefore, a basic comparison analysis of the power consumption of these pumping devices will help to distinguish this invention while providing more clarity than the previous art.

First, considering the steady flow energy equation discussed above, the enthalpy (i.e., sum of internal energy and the flow work) change can be expressed in terms of other properties of a substance. For example, as is well known, for an incompressible substance, i.e., water, the enthalpy change is equal to the pressure change divided by the density. For an ideal gas, the enthalpy change is a function of temperature. As is well known, the classic ideal gas laws such as Boyle's, Charles and the Equation of the State can be utilized to obtain various relationships among the gas properties. These relationships are used in the conservation of energy equations for obtaining more practical power input or output expressions of these steady flow pumping devices. For example, for power calculations, the most commonly used relationships and/or assumptions are the equation of state and $PV*n=C$, in which if n=1 then T=C, if n=k=Cp/Cv then adiabatic and if n=n then polytrophic process. Special cases such as isentropic (frictionless adiabatic, an ideal process) and the isobaric (P=C) are also used, dependent on the process across the machine. In the present invention, the fluid handling equipment such as compressors, pumps and/or hydraulic systems (gas compression hydraulically instead of using a compressor) are used during the sub-sea energy storage operation. Therefore, a short mathematical discussion of the basic energy consumption of these devices including pump and compressor power inputs and/or a comparison analysis will further, assist in understanding the invention.

Assuming an adiabatic process, the ratio of the power consumptions between a compressor and the pump having the same mass flow rates and efficiencies (they are usually very close, 75%-85%) can be expressed: $W'$ comp./$W'$ pump= $[Cp \times T1 \times (Pr*(k-1)/k-1)]/[(g \times H)/1000]$. In this equation, Cp is the specific heat at constant pressure (KJ/kg-K), T1 is the initial temperature (° K), Pr is the pressure ratio (P2/P1) of the compressor, g is the gravitational constant (9.81-m/s*2) and H is the total head (m) of the pump and k is the adiabatic gas constant–the ratio of specific heats (for air 1.4).

As one can see from this equation, a compressor will consume more power than a water pump under the same pressure heads. For example, consider a generic air compressor and a water pump (i.e., single, double or multi stages, reciprocating/piston or centrifugal etc.). Air at atmospheric conditions (i.e., 1 bar and 27 C) enters into a compressor and it is compressed adiabatically to 10 bars or 100 bars. For the pump, water enters at atmospheric conditions and is pumped to 100 m height or 1000 m height (i.e., pump exit pressure is 10 bar or 100 bar). Further, assume that both devices have the same mass flow rates. Using the above power ratio equation, it can be seen that the compressor power will be 80 to 278 times higher than a pumping power for 10 and 100 bar exit pressures (compressor power relation is non-linear with respect to pressure ratio). Again, due to compressibility (a gas vs. a liquid), the compressor will use much more power input than the pump under the same mass flow rate and the same pressure head conditions. On the other hand, as an example, if we use a pump to accomplish a gas compression (i.e., a hydraulic system) instead of a compressor at the same volumetric flow rate of the compressor, the pump power consumption is higher than the compressor power. In the above example (air), the pumping power needed is approximately 3.5 to 12 times higher than the compressor power for 10 and 100 bar final pressures respectively. This is true due to the difference in densities between air and water, while keeping the pump swept volume per unit time the same as the compressor.

As mentioned previously, these qualitative comparisons of pump and compressor power consumptions are significant for the present invention, which may utilize both some or all of these devices. This is an important improvement over previous art which are too often either too weak or unclear about the net energy balance to operate their storage systems in a cyclic mode rather than a one time operation.

Also, existing land based energy fluid storage systems have many problems. They are not safe in case of any accident such as fire or leaks. They can cause huge damage to the environment, life and the surrounding property. Furthermore, they are costly to build and have technical limitations regarding how big the pressurized storage tanks can be built and still operated safely. As is well known, the higher the internal pressure, the higher the stresses on the tank construction material. Therefore, high pressure tanks require high strength construction material. The bigger the tank, the larger the wall thickness may be required. Therefore the land based large storage tanks are not low-cost solutions to energy fluid storage. As an alternative to conventional above ground storage tanks, especially for large volume storage needs, the underground storage facilities, especially using salt caverns, were explored for storing fossil fuels including the compressed gas. Some underground storage reservoirs along the main gas pipe lines are used temporarily. Despite the large storage capacities, whether underground or above ground, they are very expensive to build in addition to other strategic problems. Currently there are only two compressed air storage facilities (CAES) in operation around the world, both of which are land-based. One of them is in Alabama, USA, and the second, and oldest one, is in Germany. Another technical (operational) problem with (whether underground or above ground) is the pressure variation during the withdrawal of the gas for distribution or to run a power plant (i.e., for example a gas turbine). These pressure fluctuations, despite the use of smoothing devices such as diaphragm, regulator or a buster device, will have negative effects on the overall efficiency of the entire operation. As seen from these, a need for new, innovative storage facilities especially for storing natural gas, exists. The storage technology offered in the present invention provides substantial improvements over the existing energy storage may systems, apparatus, and methods, as one or more of the problems discussed above are either eliminated or substantially mitigated. The advantages include (but are not limited to) economy, reliability, safety, low cost construction and operation. Moreover, storage tanks configured and sited in accordance with the present invention may be capable of storing large volume of compressed energy fluids while providing significantly more security and safety than conventional land-based storage tanks.

One feature of the of invention disclosed herein is the use of new and novel methods and apparatus for storing very large volumes of energy fluids including compressed air, natural gases, and liquefied gases (LPG, CNG, LNG and others) within deep water, floor-mounted sub-sea storage facilities.

A further feature of this invention is a sub-sea storage system that can be extremely safe, out of sight of land, low cost to build and operate, and operate very efficiently, while capable of storing significantly large volume of compressed gases (especially for storing and transporting LNG in an extremely cost effective way) without building costly, land-based, insulated storage tanks and re-gasification apparatus.

Another feature of the disclosed invention is the compatibility with existing renewable energy generating systems including wind, solar and ocean current-wave based energy generating sources for storing energy from these sources.

Still another feature of the disclosed deep water energy fluid and system can be a low cost, safe and efficient loading and unloading and distribution terminal for compressed energy fluids instead of the existing land based or near-shore terminals/which are unsafe and environmentally dangerous in the case of an accident.

Since LNG has less environmental impact among fossil fuels, it is another objective of this invention is to provide a practical, safe and low cost and efficient alternative solution to the existing LNG land based loading/unloading terminals and storage systems.

Still another objective is to show that fresh water can be produced during the LNG storage process.

These objectives of this invention are accomplished in the following manner as explained briefly here in after.

SUMMARY OF THE INVENTION

In accordance with one aspect of the present invention, a method for storing energy in gaseous form includes providing a gas containment structure having an interior defined by a top, one or more sides, and a bottom, and positioning the containment structure below a surface of body of water, the structure being configured for water flow communication between the body of water and the structure interior at a location adjacent the structure bottom. The method further includes selecting an energy-containing fluid from the group of fresh waters gaseous energy-containing gases, and liquefied energy-containing gases, and providing a conduit for the energy containing fluid to flow between a source of the energy-containing fluid proximate the surface of the water body and the structure interior adjacent the structure top. The method also includes flowing the energy-containing fluid from the energy-containing fluid source through the conduit into the storage structure interior, the energy-containing fluid entering the storage structure being essentially in a gaseous phase. And the method still further includes displacing a volume of water from the containment structure interior substantially equivalent to that of the energy-containing fluid entering the structure interior.

In accordance with another aspect of the present invention, system for storing energy in fluid form includes a fluid containment structure having an interior defined by a top, one or more sides, and a bottom, the fluid containment structure being configured to be operable when filled with fluid while submerged beneath a surface of a body of water at a preselected distance from a floor of the body of water. The system also includes passage means adjacent the structure bottom for providing flow communication between the structure interior and the body of water, and conduit means operatively connected to the containment structure top for providing flow communication between a source of an energy-containing fluid adjacent the surface of the body of water; and the structure interior, wherein the flow of the energy-containing fluid entering the containment structure displaces an equivalent volume of water through the passage means. The system still further includes pumping means for providing a flow of the energy-containing gas into the containment structure interior against a back pressure essentially equal to the static pressure of the body of water at the preselected distance.

In accordance with yet another aspect of the present invention, a method for producing and storing hydrogen gas includes providing a gas containment structure having an interior defined by a top, one or more sides, and a bottom, and locating the containment structure below a surface of a body of sea water, the structure being configured for sea water flow communication between the body of sea water and the structure interior at a location adjacent the structure bottom. The method also includes selecting a material reactive with sea water to produce hydrogen gas, and transporting the material to the interior of the structure proximate the structure bottom. The method further includes evolving hydrogen gas within the structure interior by reacting the reactive material with sea water, and displacing a volume of sea water from the containment structure interior substantially equivalent to that of the evolved hydrogen gas.

Generally, this invention relates to a sub-sea, (underwater) energy storage tank system. The system is filled with the energy fluids pumped from a station located above the large body of the water. The storage system is composed of a large tank or a cluster of many interconnected tanks. The tanks are made of low cost materials including metals, concrete or impermeable membranes, synthetic fabrics or rubbers. The tanks are ballasted with dead weights or in other cases are tethered to the sea floor in order to overcome the buoyancy forces due to density differences between the storage fluid and the water, and also the forces due to prevailing underwater currents, if any. The storage system receives and delivers the energy fluid(s) through conduit(s) running between a surface station and the tanks. The surface station can be a floating platform, a tanker ship or an offshore facility or a power plant or a nearby land-based terminal. The tank bottoms are either completely open or they have large ports to allow the surrounding water to flow in and out during the discharging or charging processes respectively. The fluids are pumped using pumps, compressors, multi-phase pumps or hydraulic-based compression devices. The fluids can be in the form of liquids such as fresh water e.g. from a desalination or rain water collection facility or compressed gases including air and liquefied gas such as LNG. During the charging process, the compressors or pumps will require large power inputs that can advantageously be supplied from renewable electric generating sources during off peak hours or a direct pull from the grids.

For storing liquefied natural gas (LNG), the LNG in its liquid form is further pressurized at a supply station (i.e., for example the LNG tanker). Then, the LNG is pumped down through supply conduit(s) of the sub-sea storage tanks. The process starts as a cold liquid at the surface, but it ends up as a dense gas within the storage tank without using expensive regasification equipment. The sub-sea storage conduit(s) are utilized as a heat exchanger with the body of water for re-gasifying the conveyed energy fluids. At the surface, the subcooled liquid LNG pressure is adjusted so that the high pressure, natural gas is the substance entering or released into the storage tank at the sea floor. The gas phase is accomplished due to the optimized energy balance (i.e., convection heat transfer) between LNG and the ocean water surrounding the conduit. Additional pipe loops can be placed at the surface location and at the bottom of the storage tanks as extended heat transfer surfaces. The bottom pipe loop can also serve as a dead weight to help secure the tanks to sea floor, if needed. This addition will ensure that substantially only LNG in the gas phase enters the tank while retaining slightly higher pressure than the surrounding water.

The initial pumping pressure (additional pressure increase over 1 atm, −160 C, liquid LNG storage tank) is selected carefully. It is mainly dependent upon depth, length of the conduit and the heat transfer process between the LNG and the ocean water. In a LNG phase diagram operation within, the large sub cooled liquid and short two-phase (heat of vaporization-latent heat) regions are preferred for both eliminating two-phase flow problems in the conduit, while helping to vaporize quickly within the last segment of the entire conduit/pipe. Deep water pressure by itself is the pumping source during the retrieval of the stored energy fluids at constant pressure. Since the LNG does not mix with water or form slicks as other petroleum products, the high pressure gas or even some liquid LNG (as long as large ice blocks are not formed) can be released directly into the water within the storage tank.

The sub-sea storage tank(s) can also be utilized to generate and store H2 gas. Within the sub-sea storage tank(s), the hydrogen gas generation is accomplished by a chemical reaction taking place between the activated Aluminum (or metal alloys) and the surrounding water without using electricity, as opposed to the electrolysis method. New methods and apparatus for use in compression and/or transfer of the energy fluid(s) into the sub-sea storage tanks are also presented instead of using the conventional fluid handling devices such as pumps and compressors. Basic energy equations related to the sub-sea energy storage process, are also presented for a better understanding of the fundamentals of the proposed storage system. The present invention encompasses at least one or more of the following innovative methods, apparatus, and systems for storing large volumes of energy fluids, (i.e., gaseous and/or liquid) storage.

DESCRIPTION OF THE DISCLOSED EMBODIMENTS

Since the natural gas being considered is less harmful to environment than liquid fossil fuels, the gas storage systems installations gained substantial momentum around the world, especially over the last 20 years. Despite increased activities in gas storage, mainly two important issues among the many others are extremely critical for the advancement of this sector. These issues are safety and the size of storage volume. However, a negative is that these two factors are inversely related. Storing a large mass of gas requires either a high compression pressure or low pressure but large storage volume. As mentioned above, these two factors are also inversely related from a safety point of view. Thus, land based fixed volume storage technology has limited capacity and has many problems including costly construction, especially large tanks at high pressures. The present invention provides a solution to the land-based gas storage problem by exploiting the high ambient pressure existing beneath the surface at large bodies of water such as oceans or deep lakes.

Figure 1:
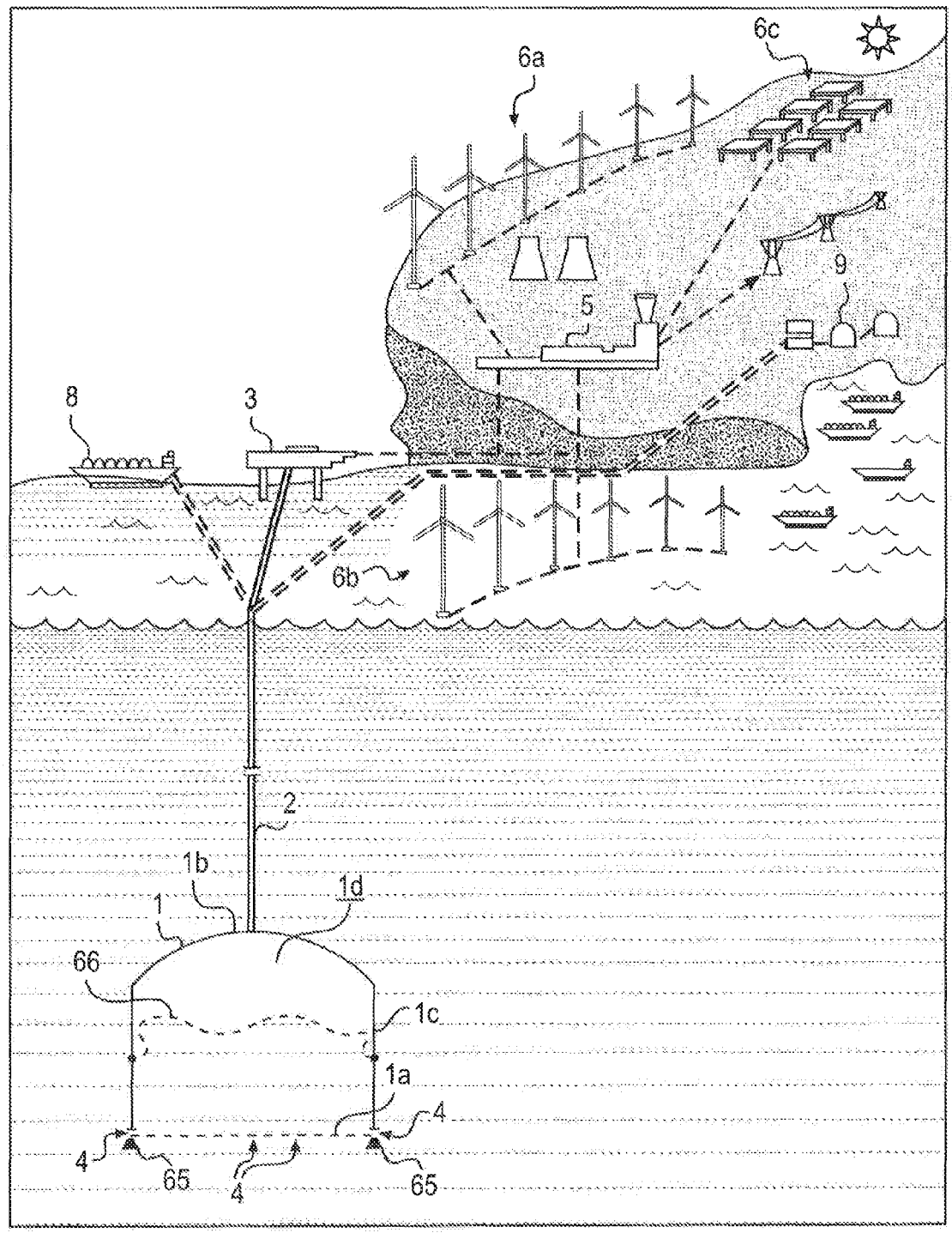
FIG. 1 is a general view of an energy-containing fluid storage system according to the invention.

FIG. 1 is a general representation of the underwater storage system for energy fluids according to the invention. The purpose of this figure is to show that a wide range of energy sectors can be integrated into the proposed storage system. It is very important to outline our energy storage systems, methods, and associated apparatus first. Later, details including the equipment and/or components which may vary slightly dependent upon the energy fluids such as LNG vs. compressed air are discussed. It is also important to mention that any skilled person with a qualified background will understand that the systems, methods, and apparatus explained here using this figure is not limited only to the content included in this figure, but also its coverage extends to other areas where the fundamentals are applicable. Hence, the broadest scope of the present invention is to be determined by the appended claims.

Figure 2:
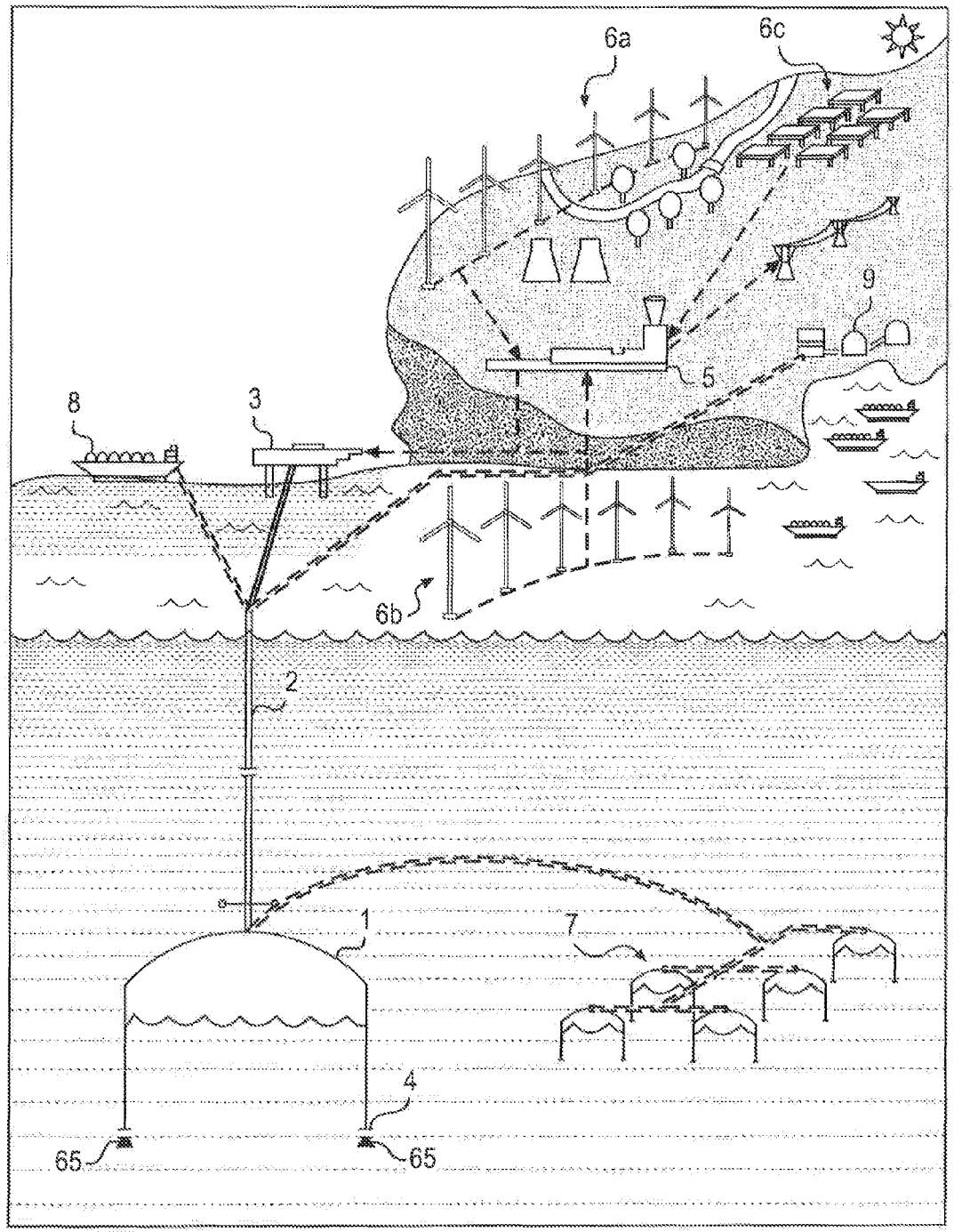
FIG. 2 is a general view of a cluster of sub-sea interconnected storage tank facilities.

As seen from FIG. 1, the main components of the proposed system are a large storage tank 1 secured to the sea floor. The tank 1 includes a bottom portion 1a, a top portion 1b, and one or more sides 1c. Fluid transfer equipment such as a pump, compressor or a hydraulic based pumping device and all the main control devices (electronic/mechanical controls, PLC-computer), can be located at a surface station(s) 3. The tank is connected to a surface station via fluid charging and discharging lines or conduits 2. The sub-sea storage tank bottom portion 1a is either completely open to the surrounding water or closed, but with one or more open ports 4. The sub-sea storage tank system can be comprised of either a large single tank or a cluster 7 of many interconnected smaller tanks, as shown in FIG. 2. The storage tank may optionally include a flexible bladder or membrane 66 (shown dotted) to separate the stored fluid from the water in the tank interior 1d, such as when fresh water is stored under the surface of a body of sea water or brackish water.

The sub-sea storage system of this invention is an economical and a realistic one. It is a practical solution to the large-volume energy storage problem. It is extremely safe, remote from human life and environmentally friendly. Just to give an example, consider a classic gas turbine based electric generating power plant 5, in which the main energy input is fossil fuel, say natural gas (NG). As is well known, although it depends on the type of turbine and operating conditions, as much as ⅔ of total energy generated by the turbine is consumed by its compressor which is located at the front portion of the gas turbine. Furthermore, during hot summer hours, when electricity is needed the most, the overall efficiency of the turbine systems drops as much as 10% or more due to the increase of the incoming air temperature (i.e., less dense air). With the help of the fluid storage system disclosed herein, these problems associated with gas turbine power plants are minimized, while helping both the environment and using renewable energy sources for pumping, such as land-based wind turbines 6a, water-based wind turbines 6b, and/or photo-voltaic solar panel arrays 6c, etc. For example, consider that sub-sea storage tank 1 is designed, built, and used for compressed air energy storage purposes only. In the presently disclosed system, it is preferable that the electric energy needed to run the compressor for the air to be stored will be supplied from renewable sources (e.g. 6a, 6b and/or 6c), whenever available. For example, during off-peak hours or even off-peak months of the year or during excess energy generation periods due to large fluctuations in the main energy sources. As seen from this, the required energy to run the compressor can be flexible and can advantageously use free or low cost renewable energy. It does not require electricity on a rush schedule to fill the tank(s) because of the large size of the gas storage volume. This is an added value to the presently disclosed energy storage system because it can utilize unwanted or free energy which otherwise would be wasted or not produced when the renewable natural sources are at the peak conditions. Electric generation from the renewable energy sources such as wind generator units (e.g. 6a and 6b) or solar farms (e.g. 6c), ocean wave or current based generators or even a hydroelectric facility (all not shown) is not steady. The output fluctuates due to the nature of the energy sources as the name implies. The presently disclosed energy fluid storage system fills this fluctuating gap for both charging the storage tanks and retrieving the stored energy. Because of the large size of the storage tank(s), the retrieving storage energy can be synchronized with surface operation and/or demand so that the storage system can be used as a large supply reservoir. Of course, the above example is not restricted to compressed air only. Any compressed gas that is immiscible with water, including fossil fuels-based natural gases, can be stored.

Figure 3:
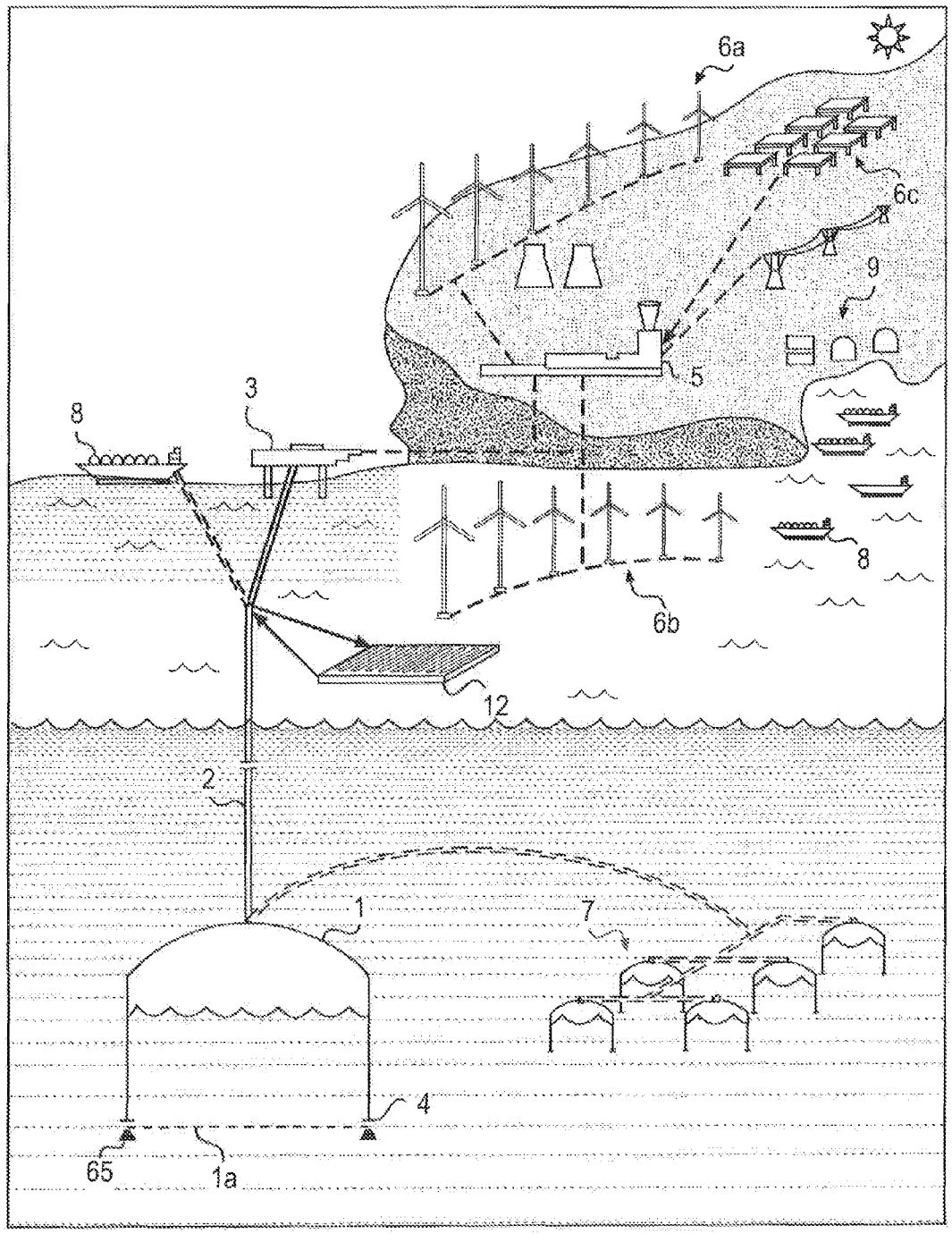
FIG. 3 is a schematic of a liquefied natural gas ("LNG") sub-sea storage system.

For storing natural gas (NG) from LNG sources, the method and apparatus are slightly different than that for compressed air or other dry-gas storage systems. For LNG storage, both the pumping process and the charging conduit(s) 2 are designed specifically to handle cold, liquefied natural gas. The pumping process starts with the LNG from its surface storage facilities. The LNG original storage location can be a LNG tanker 8 or nearby land-based LNG storage tank(s) 9 with the LNG at approximately 160° C. and 1 atm. The cold LNG from its original location is pumped through the supply conduit(s) 2 and through other, auxiliary heat exchanger(s) 12 (see FIG. 3) if needed, and ends up as a high pressure dense dry gas in the upper part of 1d of sub-sea storage tank 1.

Using a cryogenic pump or pumps at several stages (this technology already exists), before pumping down to the tank, the LNG pressure is raised from 1 bar to higher pressures close to triple point pressure. As an example, the LNG pressure rise is shown in a generic LNG phase diagram included in FIG. 4. The pressurized LNG in its sub-cooled liquid state at triple point 10 is pumped through specifically designed sub-sea storage tank charging/filling conduits 2 which may be double-walled (see conduit 11 in FIG. 5B) The filling conduit(s) 2 contacting the surrounding seawater function as not just a charging/discharging pipe(s) but also as a re-gasifying boiler or evaporator heat exchanger unit for the LNG while ensuring essentially dry natural gas entering the storage tank. The initial pumping pressure at triple point 10 and flow rate are carefully chosen so that both the re-gasification energy balance and associated heat transfer phenomenon between the flowing cold LNG and surrounding relatively warm ocean water, to result in a dry natural gas in the storage tank 1. Pumping LNG as a sub-cooled liquid will also help to minimize the possibility of two-phase flow problems that may arise further down the pipe line.

As best seen in FIGS. 5A-5D, additional pipes at either the sea surface (pipes 12a) or at the bottom of the storage tank (pipes 12b) are provided for preferred vaporization of the LNG to enter as a dry gas into the storage tank. These additional pipes or pipe loops may have by-pass lines and valves so that this part of the entire piping system can be used on demand when extra heating surface areas are needed. The bottom pipe 12b (a double pipe heat exchanger—see FIG. 5D) at the bottom of the tank can also be utilized as dead weight to help hold the storage tank against buoyancy forces along with weights 65.

In the disclosed deep sea NG storage system, the storage tank NG gas level can be monitored and controlled during operation. This can be done by closing or opening valves placed at the end of inlet and exit lines within the storage tank. The valves can be controlled either electrically or mechanically. As best seen in FIGS. 5B and 5C the mechanical control can be done by floating members 13 attached to the valve arms 14, and 15. When the tank is completely full of NG, the charging valve (inlet) 14 is closed mechanically with the help of float 13, while discharge/retrieving valve 15 is open, if the mechanical control design is chosen. Alternatively, electrically-actuated valves 18 (FIG. 5C) can be opened or closed by a floating member which may be solid or hollow and of a plastic material. In this case, the floating member contacts on and off switches 16, 17, located at the top and bottom of tank 1.

Figure 5A:
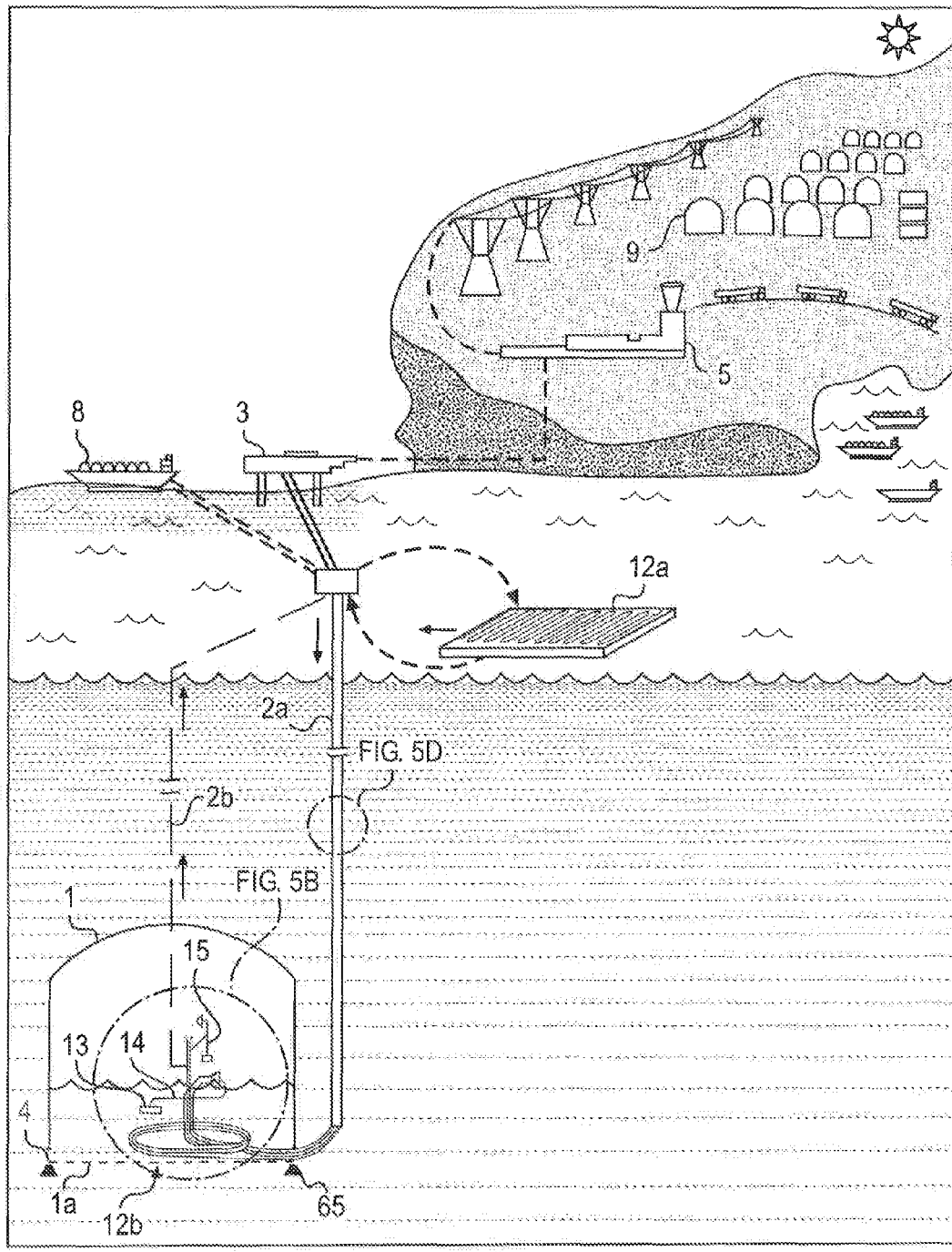
FIGS. 5A-5D are a schematic and detail views of the LNG sub-sea storage system having LNG regasification heat exchange via a supply conduit.
Figure 5B:
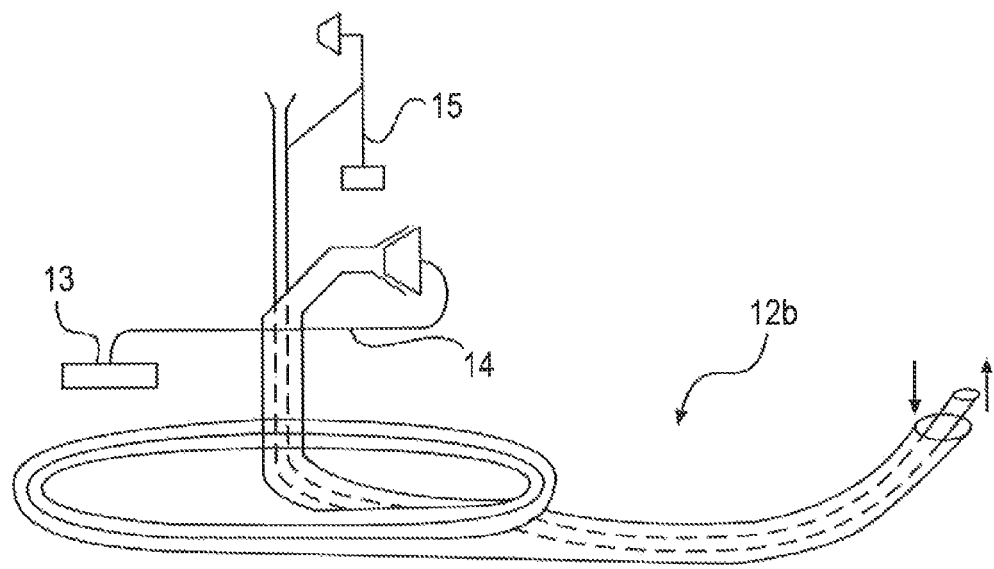
Figure 5C:
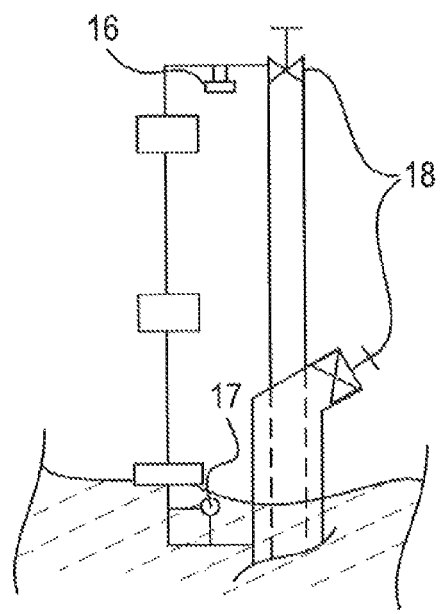
Figure 5D:
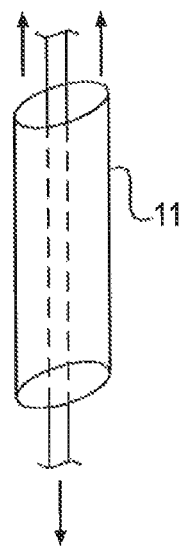

For continuous operation, if desired, charging and discharging the storage tank 1 can be accomplished through two separate conduits 2a and 2b as shown schematically in FIG. 5A, providing that re-gasification process issues are resolved. However, when the LNG re-gasification process is to be completed before releasing the LNG into the storage tank, as mentioned, surface or sub-sea additional pipe loops 12a, 12b and/or double walled conduit construction 11 (FIG. 5D) may be used in conduit 2a, in the overall storage system design.

Applying the first law of thermodynamics (i.e., energy balance) and well defined convection and conduction heat transfer equations, total heat transfer processes starting from surface to sea floor can be estimated. For this, the overall heat transfer equation can be used ($Q'=U_o \times A_o \times T_m$.) In this equation, as those skilled readers will understand, $U_o$ is the overall heat-transfer coefficient which includes both internal and external convective heat transfer coefficients, $A_o$ is a ratio of surface areas and conduction terms, and $T_m$ is either the mean or log mean temperature difference along a given segment of the conduit. The objective here is once the depth of the sub-sea storage system is known, the initial sub-cooled LNG pressure and pumping rate should satisfy all of the downstream heat transfer and flow mechanics issues related to the re-gasification process including two-phase flow problems and frictional pressure drops along the supply conduit(s). One skilled in the art could perform these calculations, given the present disclosure.

The initial sub-cooled pressurized state 10 of LNG is the starting point of the entire pumping process. This entire region needs to be heated by sea water within charging conduit(s). These include the sub-cooled liquid region and the two-phase region. All of these regions including two-phase-heat of vaporization-latent heat will affect the conduit heat transfer performance during the re-gasification process. Therefore, for a given sub-sea storage tank, depth of the large body of water, and charging conduit configuration, the surface pressure adjustment can be made to accommodate the downstream operation. In other words, the LNG sub-cooled state 10 is the system adjustment point since it is much easier and practical to raise or lower liquid LNG pressure at the surface by suitable, well known devices such or pressure regulators, booster pump/compressors (not shown) than to modify the conduit/piping heat exchanger unit.

The stored LNG can be withdrawn at a constant pressure whenever the need arises. If the storage tank depth is large (i.e., high available pumping pressure), the LNG based dry gas or other gases can be connected to a nearby gas distribution line (not shown) without additional booster pump/compressor devices. With the presently disclosed method, there is no need for a steam boiler or hot gas evaporators as hot fluid source to re-gasify the LNG as is done conventionally, thus saving huge power and thermal energies.

Figure 6:
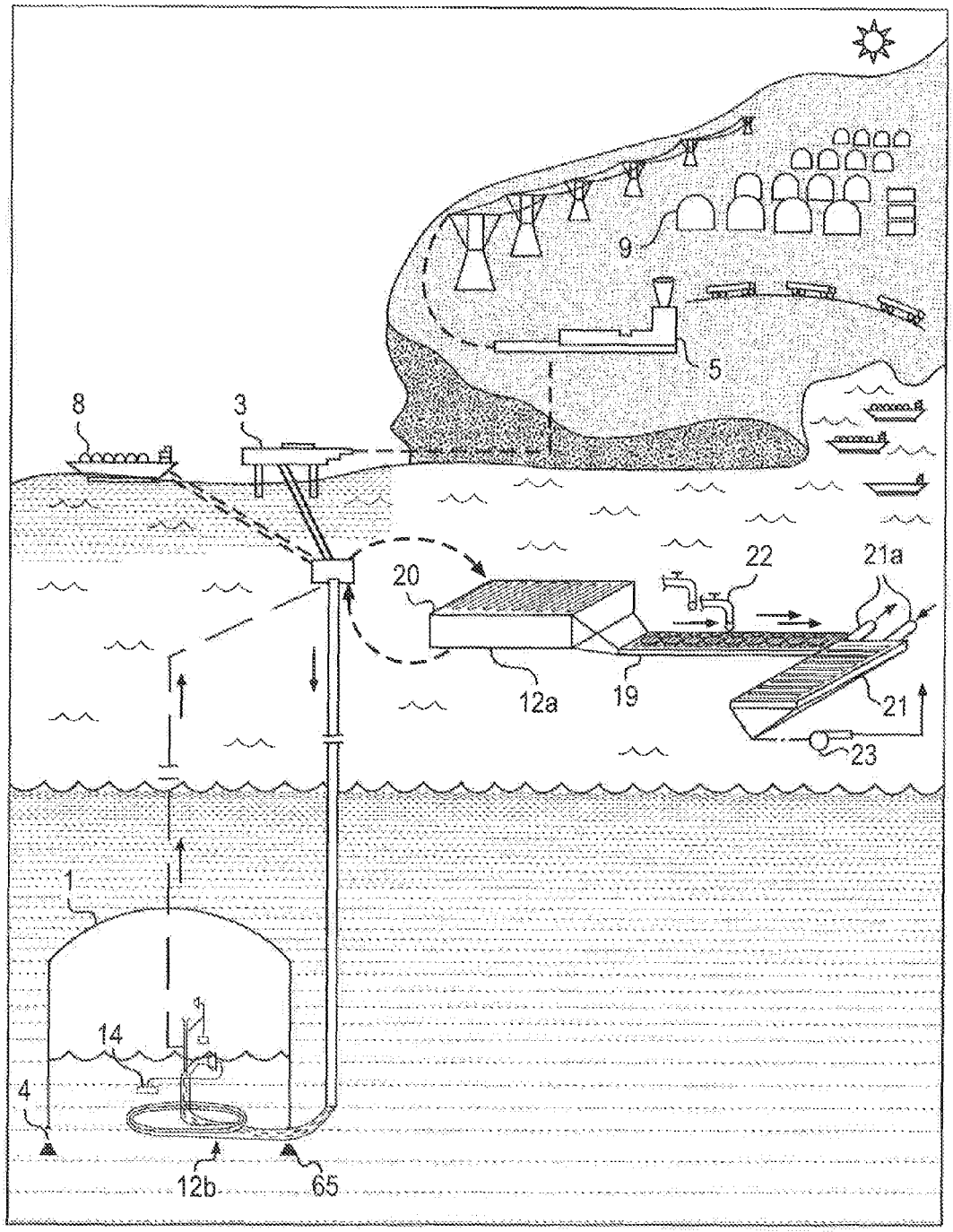
FIG. 6 is a schematic view of a LNG sub-sea storage system having LNG regasification heat exchangers.

As can be appreciated from the above discussion, the LNG sub-sea storage is one of the main objectives in this invention. However, while accomplishing the LNG storage, fresh water can be produced from sea water during the re-gasification process or pumping down the LNG into the sub-sea storage tank(s) operation. With the help of a modified conduit loop (heat exchanger that may include a helical flow design) at the surface, the sub-cooled liquid LNG coldness can be utilized to freeze sea water. As best seen in FIG. 6, the sea water can be frozen as slush, or less than about 1 cm in sized ice pieces, in a floating, boxed container 20 surrounding surface heat exchanger device 12a. A rotating belt conveyor 19 or a similar transporting device can remove the slush/ice into a fresh water accumulation tank 21. The warm sea water is circulated via heat transfer tube 21a within slush accumulation tank to melt the slush/ice slush and turn it into fresh water. The captured fresh water can be pumped out with pump 23 to a surface location where it is needed or stored in other underwater tanks having internal bladder or membrane 66 (FIG. 1) in accordance with the present invention. Although it is dependent on the initial state of the LNG, it is expected that an average of about 4 kg of fresh water from each kg of cold LNG can be produced.

Figure 4:
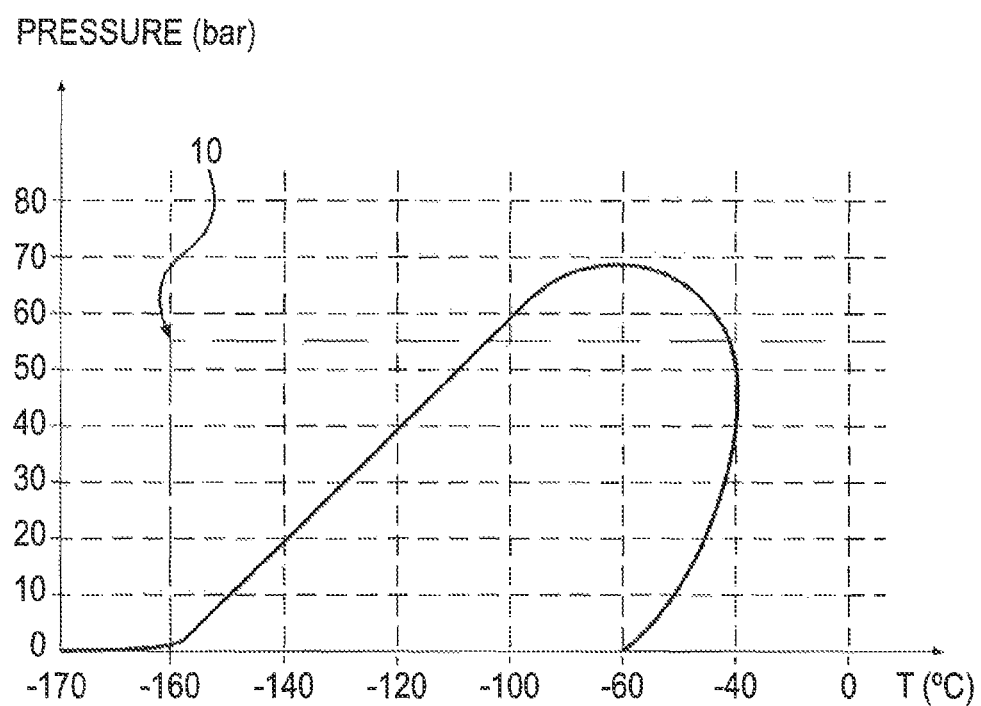
FIG. 4 is a generic phase diagram of the LNG.

As mentioned above, the amount of "coldness" that can be withdrawn from the LNG (or the correct way of saying it is that the heat input into LNG from surrounding warm sea water until the sea water temperature reaches around −3 to −5° C. for ice slush formation) is all dependent upon the initial sub-cooled state of the LNG in the phase diagram FIG. 4. For fresh water production, the double walled conduit 11 may serve as a heat exchanger (or a double pipe heat exchanger constructed similarly as the double walled conduit 11) (see FIG. 5D) and a secondary working fluid such as brine solution, antifreeze (ethylene glycol) or isopentane can be utilized to remove most of the coldness from the LNG for the maximum fresh water production while pumping down the LNG into a sub-sea storage tank for storage or dry NG. The production of fresh water while pumping down the liquid LNG is an added value that otherwise would be wasted.

The sub-sea storage system discussed in this invention can also be used for the generation and storage of large volumes of Hydrogen gas ("$H_2$"). This is done in a very simple and inexpensive way. The proposed H2 generation and storage system is extremely safe. It is environmentally friendly and economical. Conventionally, there are two methods of H2 gas generation. These are water electrolysis and the decomposition of natural gas (i.e. Methane-CH4). As is well known, the water electrolysis method is strictly dependent upon electric consumption. These conventional methods are too costly. Also, they are not practical for a large quantity of H2 generation and storage. The presently disclosed method and apparatus of hydrogen generation makes these challenging issues facing the existing methods unnecessary. The inventive method is based upon the chemical reaction between sea water and certain metal alloys including aluminum alloys. The use of Aluminum or Aluminum alloys or other chemically equivalent metals or metal alloys require no electrical input to generate H2 gas, as opposed to the conventional electrolysis method. It is well known that aluminum metal reacts with water (especially sea water) and releases hydrogen gas and other byproducts. The byproducts resulting from the reaction are dependent upon the small amount of the material used to accelerate the reaction (i.e., an accelerator used in the mixture). A suitable non-toxic, recyclable and inexpensive reaction accelerator or promoter is Galinstan, a liquid metal alloy.

Galinstan mainly consists of Gallium, Tin and Indium. It is in a liquid state at room temperature. Galinstan easily wets most metals including Aluminum. The purpose of using Galinstan is to activate the Aluminum so that the Aluminum oxide does not accumulate at the aluminum and water interface during the reaction. With the help of Galinstan, the hydrogen gas is released and the reaction is continuous. Also, importantly, the released oxygen can be safely sequestered, as Aluminum oxide ($Al_2O_3$) an inert substance. As is well known, there are other reaction promoter materials that may be used to activate Aluminum for reducing water to its reductants, namely $H_2$ and OH. The most commonly used additives are sodium oxide (NaO), Calcium Oxide (CaO), Sodium chloride (NaCl) magnesium oxide (MgO), etc. These additives can mix with the Aluminum powder to form Aluminum alloys for more pure hydrogen generation at faster rates. The simplest one, also for environmental reasons, is Galinstan which is preferable to activate the Aluminum in this invention. As is well known from elementary chemistry, when Aluminum metal (powder, or scrap or small pieces) is washed/impregnated with the liquid metal Galinstan and exposed to sea water, the reaction starts. The basic reaction equation is $2Al+2H_2O \rightarrow 3H_2+Al_2O_3+Heat$. Aluminum oxide or alumina as it is commonly called ($Al_2O_3$) suspends in water and can be recycled to recapture the aluminum metal. Hence, another feature of the present invention is to generate large amounts of H2 gas using sea water while storing the H2 gas safely at the same time in an economical and environmentally desirable way.

Figure 7A:
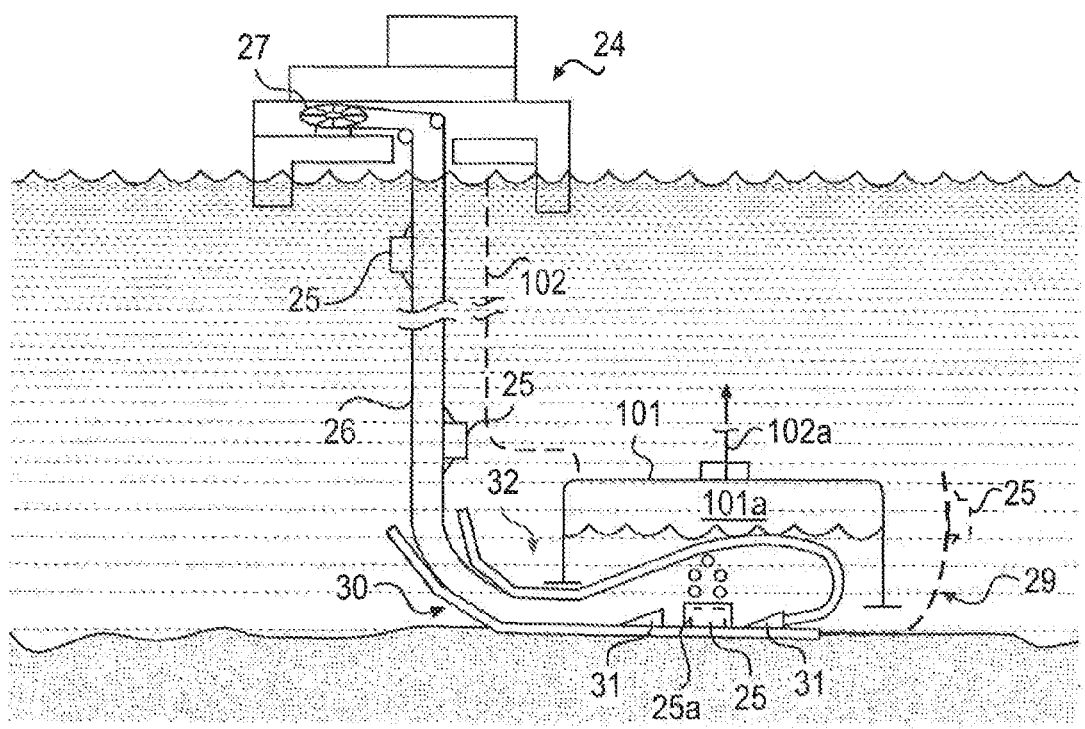
FIGS. 7A-7C are a schematic and detail views of the sub-sea Hydrogen ("H2") gas generation and storage systems.

FIG. 7A is a general view of the H2 generation and storage system in this invention. First, the pre-washed or activated Aluminum (tumbled/scratched/polished) or Aluminum alloys, or any other metal alloy that will oxidize and also reduce water into H2 gas, are prepared at a surface facility 24. Then the activated Aluminum, in the form of small pieces or chunks or powder can be delivered into a sub-sea storage tank 101 through either one of two ways. The first way is through the supply conduit 102 of the sub-sea storage tank 101. The second uses a traveling container/basket 25. The basket may be initially closed off against the sea water so as to prevent any activation but with a valve to equalize pressure when this container situated within the storage tank interior, as will be discussed later. Or, it may be preferred to have small openings in the container to equalize pressure while allowing only a small amount of reaction to take place during the travel to storage tank 101.

As depicted in FIG. 7A, the container travels via a cable or rope 26 like a sky lift cable car system. Once the Aluminum is inside the sub-sea storage tank and exposed to surrounding sea water, the reaction will start while generating hydrogen gas and the byproduct alumina. It is expected that 1 kg of Aluminum will produce 111 gr. of $H_2$ gas while utilizing 2 kg of $H_2O$ during the reaction process (reference, Jun. 30, 2010, nanohub.org by Joseph M. Cychosz, Jerry M. Woodall, http://nanohub.org/topics/SplittingWaterUsingAluminum). The suspended alumina ($Al_2O_3$) can be accumulated inside a strainer type cloth or wire mesh housing 25a while hydrogen gas travels to the upper region 101a of the sub-sea storage tank 101. After a predetermined time limit (+/−) corresponding to the end of the reaction process time, the alumina filled container 25 is pulled back to surface for recycling.

Dependent upon the depth of the ocean or a large body of water where the storage tank is located at the bottom, the large volume of the hydrogen gas under deep water static pressure can be retrieved through a discharge conduit 102a to generate power at any surface location. This method automatically eliminates many problems associated with conventional land based hydrogen gas storage systems. These include, but are not limited to, the compressor power needed to compress the hydrogen gas and other major issues such as safety and technological problems, especially the construction and operation of the large volume and high pressure hydrogen storage facilities on land.

Figure 7B:
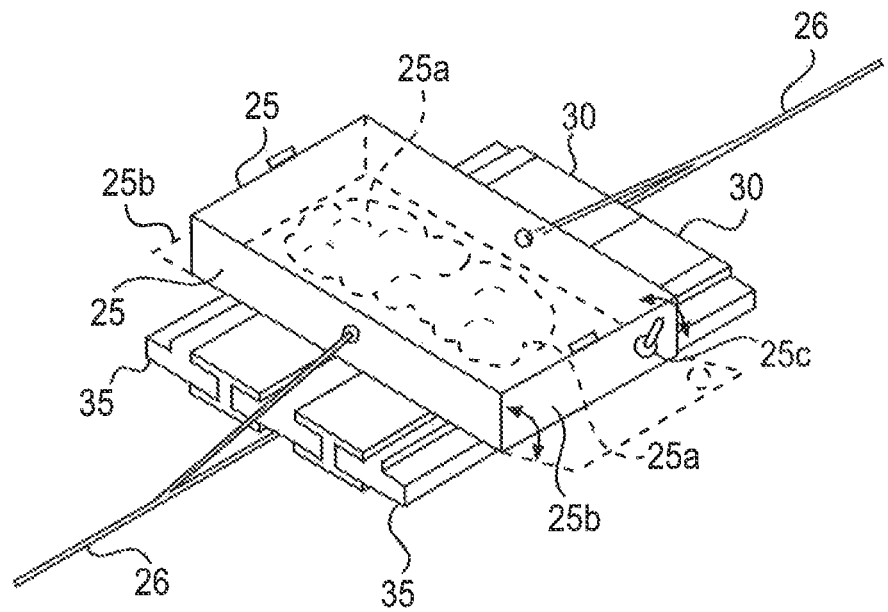
Figure 7C:
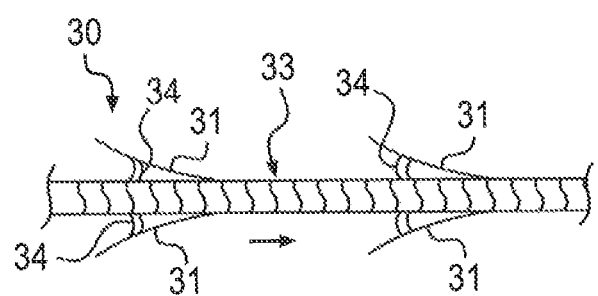

As depicted in FIGS. 7A and 7B, the activated Aluminum or any other pre-prepared metal or metal alloys that will reduce the sea water to release the H2 gas, can be transported in container 25 to sub-sea storage tank and retrieved after completion of the reaction by using a simple cable car 26 (i.e., cable lift, gondola type) technology whose main driving wheel 27 is located at the surface station 24. When the cable car method is chosen instead of dropping metal alloys through the tank surface connecting conduit(s) 102, the metal alloy cargo carrying container 25 can be guided by either a one way track 29 or a roller coaster type loop tracking system 30 within the storage tank 101. The roller coaster type loop tracking system 30 is secured to sea floor and is isolated within the sub-sea storage tank 101. This tracking system 30 and side guiding rails 31 (or walls) will help to position the incoming container 25 filled with the activated metal alloys. The main purpose of this tracking-rail system is to bring the metal alloy loaded container to the center of the bottom of tank 101, keep it for a while until the chemical reaction with the sea water is over, then help to guide the container filled with the reaction by-products to the exit 32 of storage tank 101. The side guiding rails or walls 31 are designed similar to two converging open channels (i.e., open nozzle ducts) placed in a series. See detail in FIG. 7C. The open space 33 between two nozzle-shaped guide rails or walls 31 is used for the activated metal alloy carrying the container stops or as a waiting station until the chemical reaction is completed. These side rails or walls 31, starting from the large inlet side, increase in height and are equipped with special metal bars 34. These special metal bars 34 positioned along the side walls are used to trip a pressure-equalizing valve 25c and this open the cargo box by unlatching and pulling down the side walls 25b, and then to close the side walls 25b walls when it is in the exiting mode. In other words, a mechanical latch type system is utilized to open and close the side walls 25b of container 25.

Specifically, to maintain an essentially sealed condition for container 25, latched pivoting side walls 25b can be used in conjunction with a valve, such as globe valve 25c, to be opened when container is positioned within or beneath storage tank 101. Valve 25c may be configured e.g. with an activating lever arm positioned to be engaged and opened before the latches on side walls 25b are released to allow pressure equalization. Also, valve walls 25c may be opened by suitably configured bar members 34. Before a new shipment starts from a surface station, the H2 generating metal alloy(s) is first placed inside a bag-type receptacle 25a such as a fine mesh metal screen cage or a high temperature resistant permeable bag such as one made from a woven carbon fiber fabric, and receptacle 25a then sealed within container 25. The container 25 shape can be cylindrical or rectangular. Track guiding slides/bars 35 or solid plastic rolls, placed strategically outside of the container, will provide for smooth travelling along the cable and easy maneuvering over the track system 30 within the storage tank 101.

In general, the sub-sea storage tank systems discussed previously are charged with energy fluid(s) including air and natural gas using some type of transport device such as a pump or compressor located at a surface location where the energy fluids are stored initially. These fluid handling devices are the main energy-consuming devices in the entire system.

In another feature of this invention, new and alternative compression devices for charging the storage tank(s) with energy fluids are disclosed. Hence, another feature of this invention, as broadly disclosed herein, is to provide the basics and scientific fundamentals of these new and novel sub-surface compression methods and apparatus.

Figure 8A:
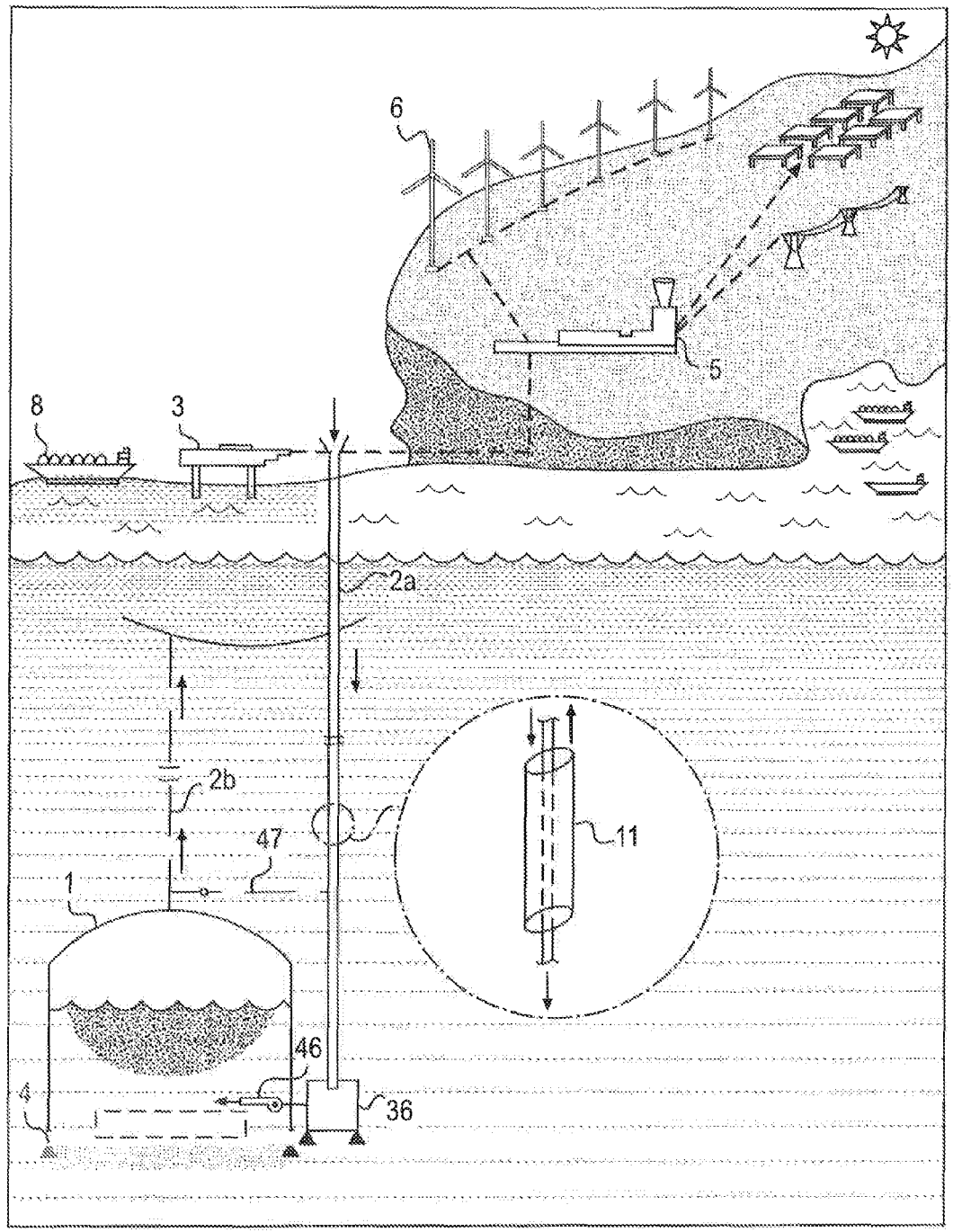
FIGS. 8A-8E are a general view and detail views of a sub-sea storage tank including gas pumping apparatus placed adjacent the storage tank.
Figure 8B:
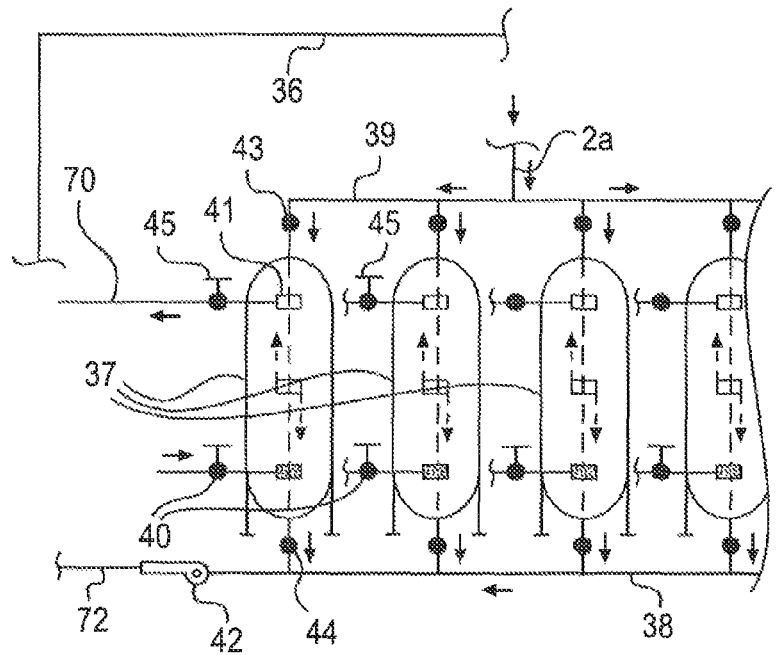
Figures 8C, 8D:
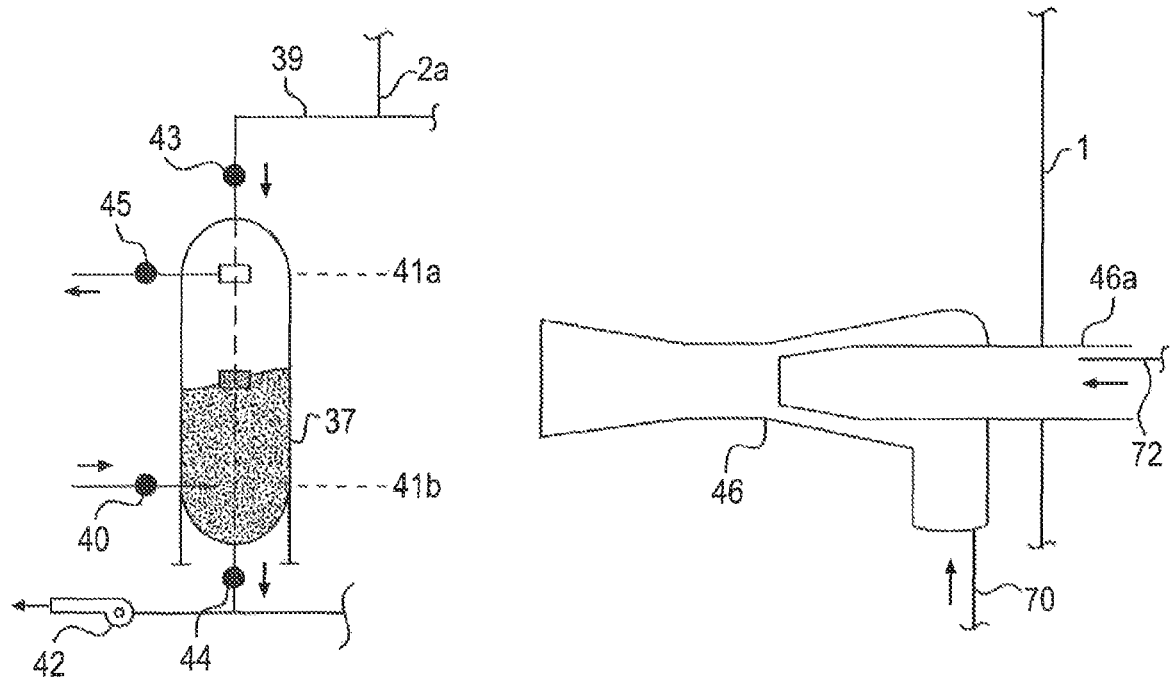
Figure 8E:
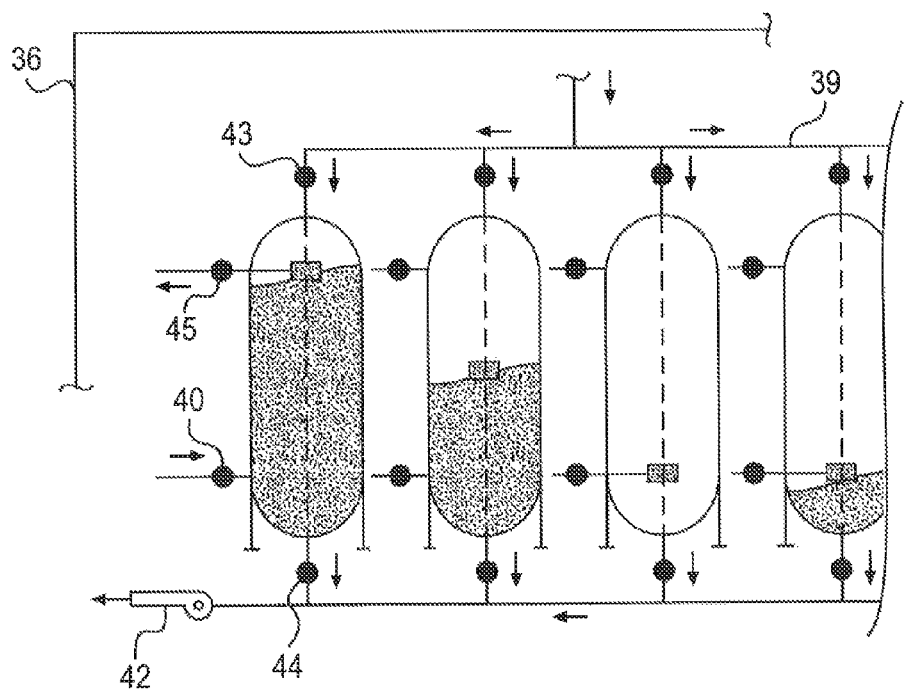

The new compression devices can be located at the sub-sea storage tank at the bottom as opposed to a surface location. FIG. 8A is an overall view of a sub-sea gas storage tank system where the storage tank is filled by compressed air (or other dry gas) using new and novel compression devices located inside a container 36 adjacent to the storage tank 1 at the sea floor, rather than using a compressor at the surface. The air (or any gas) compression process, starting from atmospheric pressure (for air) to the storage tank pressure, is accomplished hydraulically without using a compressor. As best seen in FIG. 8B and detail FIG. 8C, the compression devices inside container 36 include small cylindrical tanks 37, connecting discharge/evacuation pipe 38, gas/air accumulating manifold 39, suction pump 42, and electrically actuated valves with on/off switches that are triggered by floats such as plastic floats 41. The process works as follows with specific reference now to FIG. 8C: The atmospheric air fills the air manifold 39 through suction conduit 2a. There are four electrically operated valves on each cylindrical tank, namely an air inlet valve 43, the suction pump valve 44, ambient water inlet valve 40, and compressed air outlet valve 45. When the sliding plastic float is at the top position 41a, it triggers switches to open the air inlet valve 43 and pump inlet valve 44 while closing air outlet valve 45 and water inlet valve 40. As the sub-sea water is being pumped out (it was full from the previous stroke), the atmospheric air fills the cylindrical tank. When the float 41 is at the bottom of the tank position 41b, the valve positions are reversed and the air is compressed by flowing sub-sea water at sub-sea static pressure into the tank through valve 40. The compressed air is then withdrawn through open valve 45 and along conduit 70 into the main storage tank with a small amount of help from a jet pump 46 (ejector-circulator) located inside the main storage tank (see detail at FIG. 8D). The jet pump driving fluid (through main nozzle 46a) is also water and it is coming from the tank pump 42 which is running continuously to empty another cylindrical tank 37 which is in a tank evacuation mode via conduit 72 at that time. See FIG. 8E, which depicts a series of interconnected cylinders wherein the charging condition is staggered to provide a more continuous flow of compressed gas to storage tank.

Figure 9:
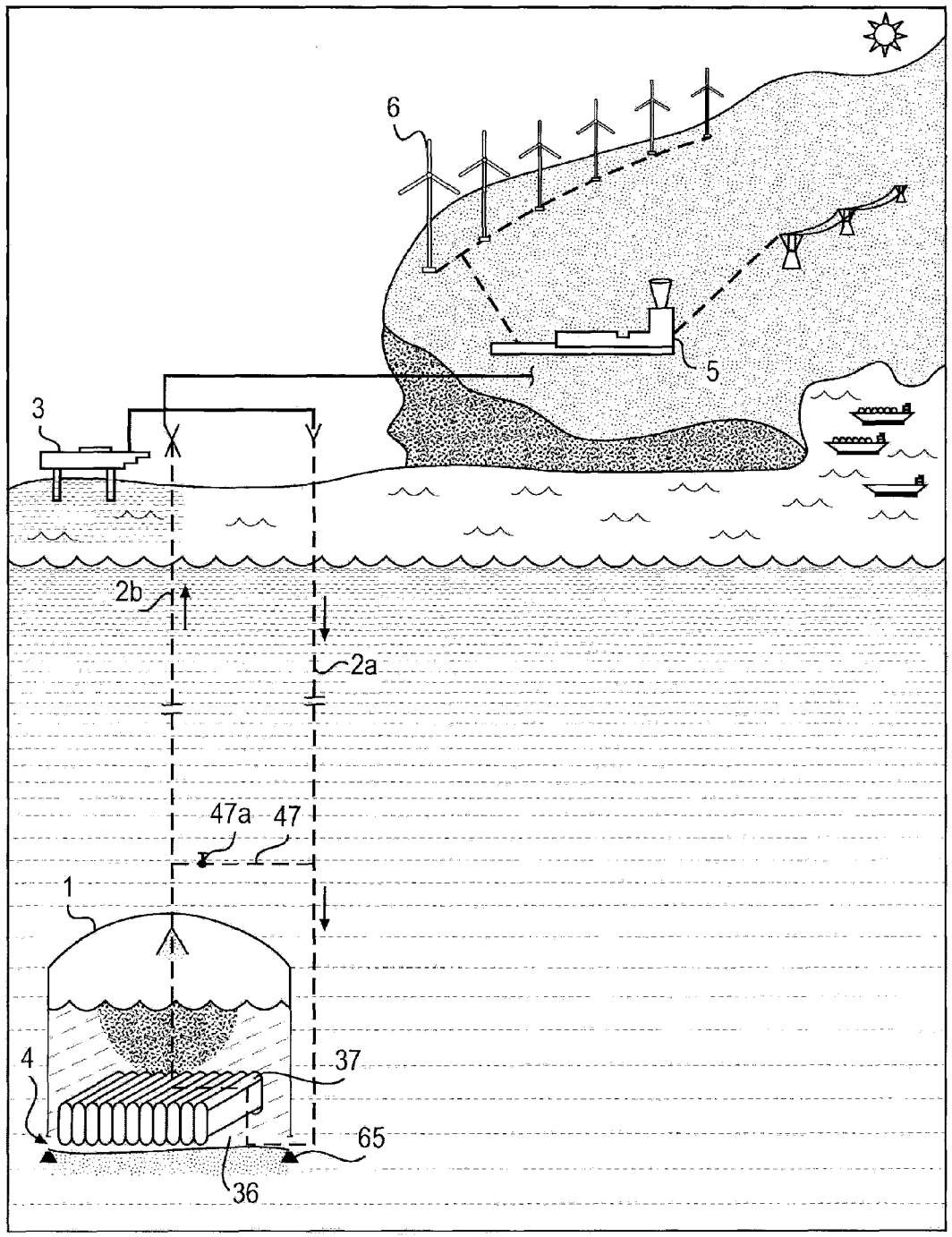
FIG. 9 is a general view of the sub-sea storage tank and gas pumping apparatus placed inside the storage tank.

FIG. 9 is a general view of the same storage system discussed above except that the air (or any gas) compression devices are located inside the main storage tank as opposed to the above example. In this embodiment, there may be no need for jet pumps (either 42 or 46) as in the FIG. 8A embodiment. The compressed air from the air cylinder 37 is released directly into the main storage tank. All other components, and the operating mode and procedures, are the same as discussed above in relation to the embodiment shown in FIGS. 8A-8E. The main supply and discharge conduits 2a, 2b respectively of the storage system can be constructed from a single pipe or alternately by one or both lines having a double pipe system similar to double walled conduit 11 depicted in FIG. 5D. For a better utilization of the storage operation, a by-pass line 47 controlled by valve 47a can be installed between the suction and discharge conduits (separate lines) of the storage system.

As seen from these storage systems, the main driving forces behind the gas compression process can be hydraulic, piston-less pumps rather than rotating centrifugal compressors or pumps with pistons. Of course, the pump pressure head is equal to, or slightly higher than, the static pressure of the deep water within the storage system. The pump flow rate is proportional to the air supply rate or air cylinder cycle rate to the storage tank. The main advantage of this system is that use of a small capacity pump but having large static head can accomplish the compression.

Figure 10A:
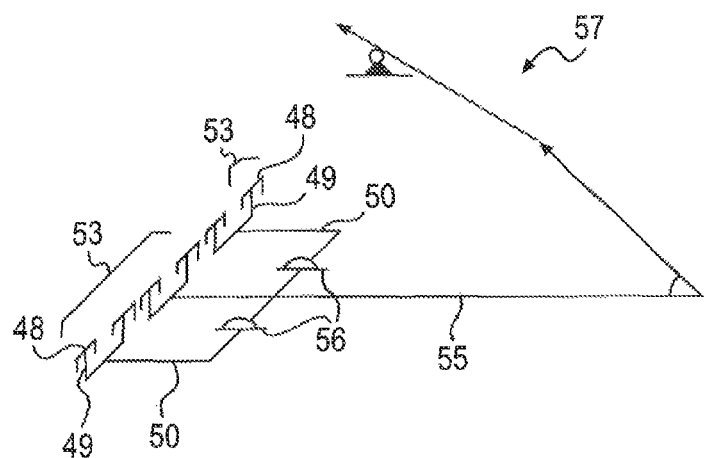
FIGS. 10A-10E are schematics of alternative apparatus for compressing the gas to be stored.

In addition to new gas compression method which utilizes a piston-less pressure cylinder rather than a rotary compressor as discussed above, the present invention also encompasses new mechanical compression devices to accomplish the sub-sea compression of gaseous energy fluids into the storage tank using cylinder and piston combinations. Specifically, the compressed air (or any gas) supply into the sub-sea storage tank can be accomplished using a lever-arm mechanical system. A mechanical lever moment arm system can provide substantial advantages over a conventional hydraulic pump driven, compression system. FIGS. 10A-10F depict an embodiment of the present invention that utilizes a mechanical moment lever arm system to compress a gas into an underwater storage tank. The lever arm system operates a piston-cylinder combination and works like a hydraulic pump gas compressor except that the piston rod is connected to a mechanical lever arm rather than an electric motor. Many cylinders can be grouped to design a multi compression system, as shown in FIG. 10A. In order to provide a better understanding of this method of gas compression, the working principles of an individual cylinder will now be discussed.

Figure 10B:
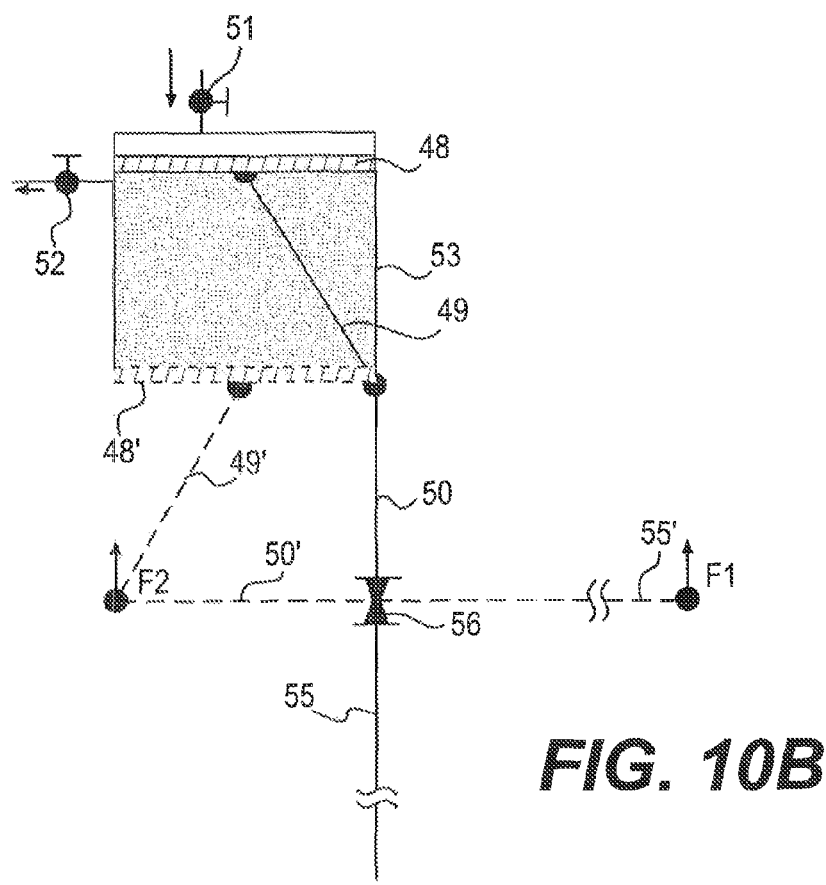

With specific reference to FIG. 10B, the positions and orientations of piston 48, piston rod 49, and lever arm 50 inside cylinder, respectively, are shown at the upper extent of piston travel in cylinder 53, while the elements 48', 49', 50' depicted by dashed lines represent the positions/orientations of the elements at the lower extent of piston travel in cylinder 53. Each cylinder 53 has an electrically actuated air inlet valve 51 and an air exit valve 52. The valve open and closed positions are controlled by the position of the piston 48 in the cylinder 53. In this system, the gas is compressed during the piston's upward stroke due to the pushing force resulting from the deep sea water static pressure. The atmosphere pressure gas entrainment into cylinder 53 is accomplished by evacuating the water from cylinder 53 during a forced downward stroke of the piston 48 which is pulled down by the mechanical lever arm system 50 (like in single stroke engine).

Figure 10C:
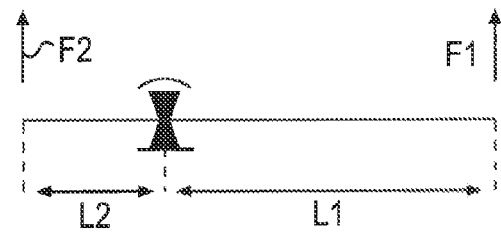

As depicted in FIG. 10C, the relationship between the cylinder evacuation resistance force F2 and the effort or driving force F1 is:

$$F1 \times L1 \geq F2 \times L2$$

where L1 is the distance along lever arm 55 portion from fulcrum 56 to F1, and L2 in the distance along arm portion 50 from fulcrum 56 to F2, and wherein the equal signs represent the static (non-moving) situation and the > sign represents the situation where F2 is overcome and cylinder evacuation work occurs.

Figure 10D:
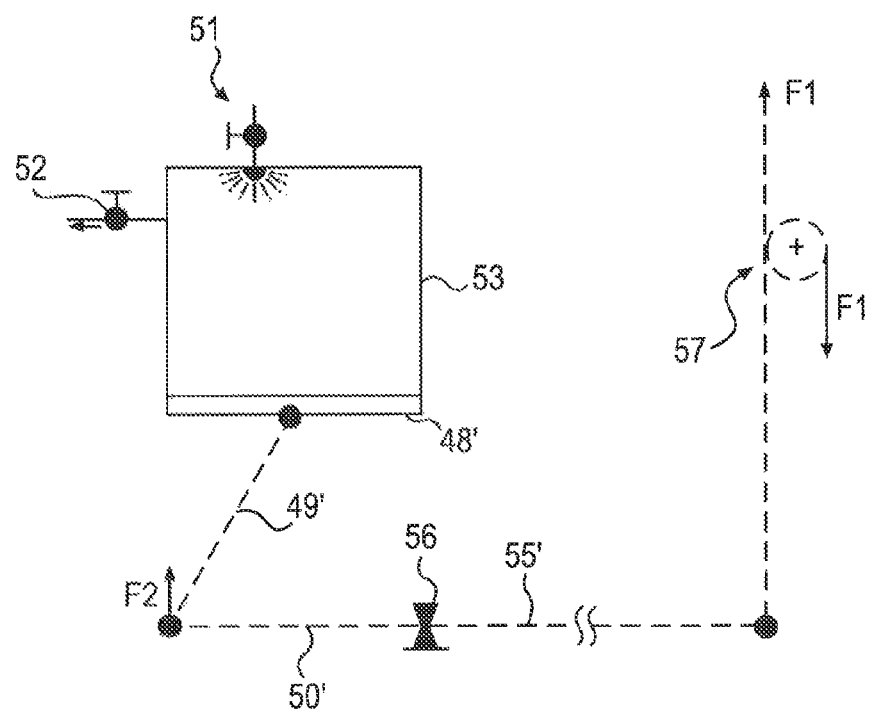

With reference now to FIG. 10D, the lever arm system can be pulled by a cable-pulley arrangement 57 either from the surface or at the sea floor. An electrical or hydraulic winch (not shown) can be used to pull the lever arm at the effort side. The main benefit of using a mechanical lever arm system for compression of a gas into the sub-sea storage tank is to gain a mechanical advantage. That is, a small effort force can evacuate the seawater from cylinder 53 providing that the lever arm 55 lengths L1, L2 from the rotating point (fulcrum) 56 are proportioned properly to the load to be lifted for cylinder evacuation. Here, as is well known, the total energy needed to accomplish the gas compression of each cycle is substantially the same for any system including a lever arm arrangement, a compressor, or a pump (hydraulic). What changes is the magnitude of, and the travel distance of, the pulling force (effort). The small forces are sufficient to accomplish cylinder evacuation but require longer travel. This may be a more practical and/or economical option due to using a small power or torque or small pulling force capacity machine (such as a winch) rather than using pumps or compressors having large pressure heads and large flow rate capacities. As seen above, the driving mechanism of the lever arm system is a pulling or pushing force (dependent on operation mode, that is, the mechanism providing the lifting force F1). This force can be generated in many different ways, such as using a cable-pulley system powered by a winch for pulling, or by a low head, low capacity pump pushing on arm 55.

Figure 10E:
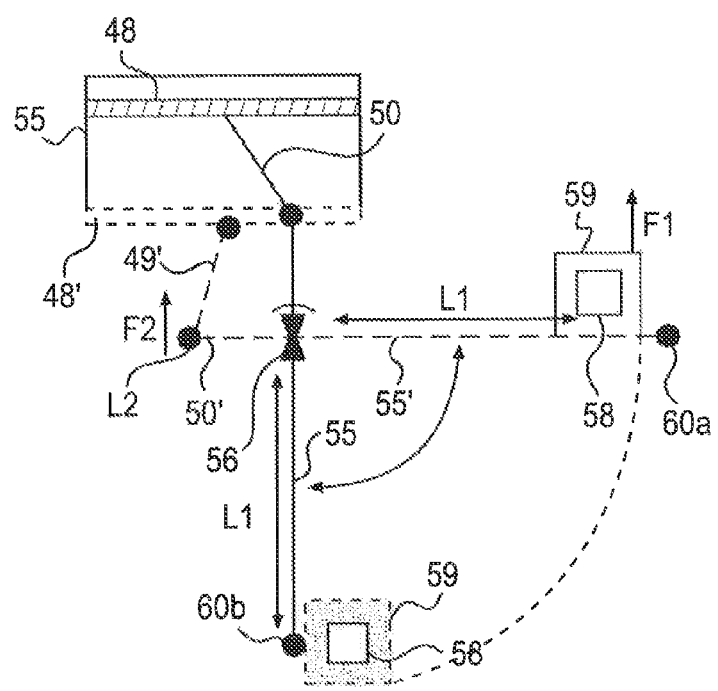

For example, and with reference now to FIG. 10E, a pump 58, housed inside a small tank 59 which is located at the end of a lever arm (effort force location) can also be used as a sub-sea driving energy source for the lever arm system instead of a sub-sea winch for the compression cylinder 53 apparatus as depicted in FIG. 10B. The filling and emptying process of tank 59 will simulate the mechanical lever arm system motion that is the necessary to the sub-sea storage tank to allow admission of the energy fluid (gas) into cylinder 53 and subsequent compression by the static deep-water pressure on piston 48. The use of a pump tank combination lever arm system can be very economical and practical over other systems as discussed previously. The total weight of the pump 58, tank 59 and other components which simulate a pulling or pushing effort force can be designed in such a way that the speed of the lever arm motion is aligned and/or compatible with the atmospheric air suction and compression processes and required time periods. In other word, the number of compression cycles per unit time can be controlled by the pump flow rate capacity and the initial weight of the small tank assembly.

Specifically, the pump 58 can be triggered mechanically with stop switches placed at the top 60a and the bottom stop positions 60b of the lever arm system. When the pump housing container 59 is full of water, due to the weight of the pump and lack of a buoyancy force, the pump assembly is at the lowest position 60b and the piston 48 is in the upmost position in cylinder 53. As storage tank 59 is evacuated and the buoyance force applied to lever arm 55 increases, the lever arm moves upward causing it to drawdown the weight on the other side (i.e., piston 48 in the air compression cylinder). When the pump is at the position 60a, the process is reversed to fill the tank 59 allowing the pressure of the water behind piston 48 to compress the air in the cylinder 53. For this, the air cylinder piston rod connection mechanism is designed accordingly to accomplish the desired processes. A lever arm system working as discussed above can also be configured to run multiple air compression cylinders, as is depicted schematically in FIG. 10A, rather than one at a time, by multiple lever arms 50. Many different arrangements can be designed to accomplish this purpose, including the one shown here by one of ordinary skill given the present disclosure.

Also, if for some reason, such as the possibility of a chemical reaction or if direct contact between water and the energy fluid or other liquids (such as fresh water, storage) are not desired, then the entire energy fluid can be separated from the surrounding water using a flexible membrane material, such as flexible diaphragm membrane 66 depicted in FIG. 1. The membrane material, compatible with the surrounding water, is preferably made from a fabric, rubber or even thin metals. During filling or retrieving of the energy fluid(s) from the storage tank, the large membrane will take the shape of the tank while separating the energy fluid from the water and allowing the pressure forces to be equal on either side of the diaphragm membrane. In other words, it is like a tank within another tank, similar to household water pressure tanks having rubber membranes. As briefly mentioned previously, the sub-sea storage tank can come in many different shapes. They can be constructed using many different materials including thin metals, fabrics (poly based), and rubber membranes. The tank material should be compatible with sea water and impermeable with energy fluids, including gases. Since the tank bottom is open or has many ports which allow the surrounding water in and out to equalize pressure, there is no issue of high pressure difference effects on tank material as is the case in conventional pressure vessel designs.

Figure 11A:
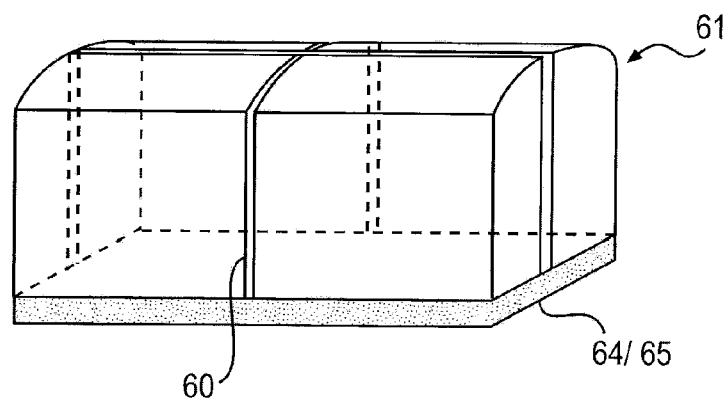
FIGS. 11A-11D are schematic views of various sub-sea storage tank configurations in accordance with the invention.
Figure 11B:
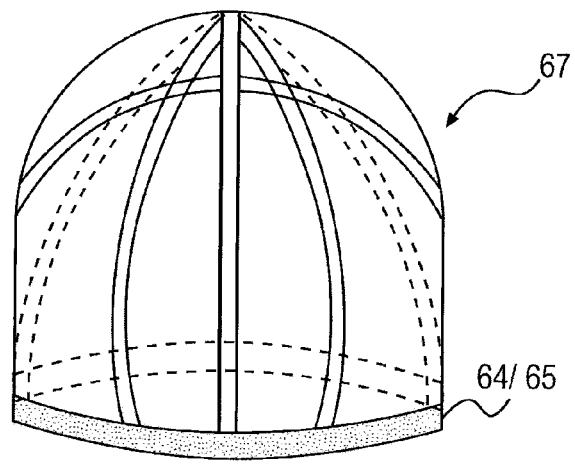
Figure 11C:
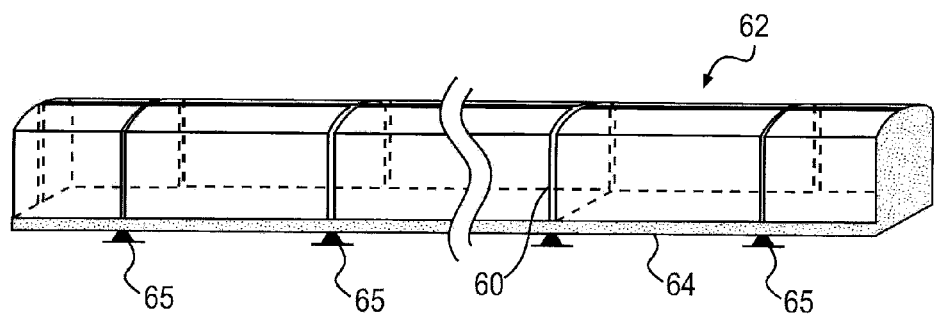
Figure 11D:
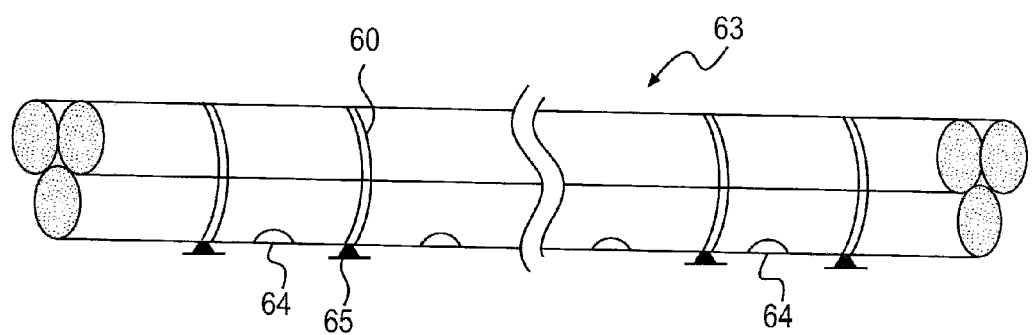

FIGS. 11A-11D various sub-sea tank shapes. They can be rectangular box shape 61 (FIG. 11A); a cylindrical tank 67 with a spherical shape at the top (FIG. 11B); or a narrow, but very long, box shape 62 (FIG. 11C). Also, large diameter pipes 63 can be stacked one on top of the other to form a storage tank (FIG. 11D). In this case, the pipes are connected to each other and the bottom ones have ports or long, open ended flexible hoses (not shown) to communicate with the surrounding water. Due to the flexibility in tank designs, including having the options of different geometric shapes and use of inexpensive construction materials because of the in and out pressure equilibrium resulting from open bottom sides 64 of the tanks, the present invention is an ideal solution to the large volume energy fluid storage problem.

In order to overcome the buoyancy forces due to density differences between stored fluids and the water, as well as the forces due to prevailing, currents, underwater the tanks need to be secured to the sea floor. This can be done by dead weights 65 attached to the tanks with high strength ropes/ strips 60 of fabrics such as Kevlar, carbon or high molecular weight poly materials. Again, due to pressure equality from the inside to the outside of the tank during operation, any high strength and flexible membrane material may be suitable for the storage tank, providing that it is impermeable to the desired gas substance to be stored and compatible with sea water. Alternatively, the tanks can be tethered to the sea floor via other means such as pilings, screw-type anchors, etc. as one skilled in the art would understand.

What is claimed is:
1. Method for storing energy in gaseous form, the method comprising:
  a. providing a gas containment structure having an interior defined by a top, one or more sides, and a bottom;
  b. positioning the containment structure below a surface of a body of water, the structure being configured for water flow communication between the body of water and the structure interior at a location adjacent the structure bottom;
  c. selecting an energy-containing fluid from the group of gaseous energy-containing gases and liquefied energy-containing gases;
  d. providing a conduit for the energy-containing fluid to flow between a source of the energy-containing fluid proximate the surface of the water body and the structure interior adjacent the structure top;
  e. flowing the energy-containing fluid from the energy-containing fluid source through the conduit into the storage structure interior, the energy-containing fluid entering the storage structure being essentially in a gaseous phase; and
  f. displacing a volume of water from the containment structure interior substantially equivalent to the volume of the energy-containing fluid entering the structure interior.

2. The method as in claim 1, wherein the energy-containing fluid is a liquefied energy-containing gas, the method further including transferring heat from the body of water to the energy-containing fluid sufficient to vaporize essentially all the fluid prior to the fluid entering the containment structure interior.

3. The method as in claim 2, wherein the body of water is a body of salt water or brackish water, and wherein the method further includes recovering fresh water in the form of fresh water ice from a portion of the body of water from which heat was transferred to the liquefied energy-containing gas.

4. The method of claim 1, further including retrieving the stored energy-containing fluid from the structure interior through a port adjacent to the structure top under conditions of essentially constant pressure.

5. The method of claim 2, wherein the conduit is configured to provide a heat transfer surface for adding heat to the flowing energy-containing fluid from the body of water.

6. The method as in claim 2, including providing a heat exchanger adjacent the surface of the body of water for adding heat to the liquefied energy-containing gas flowing from the source prior to flowing the liquefied gas through the conduit.

7. The method as in claim 3, further including providing a heat exchanger adjacent the surface of the body of water for transferring heat to the liquefied energy-containing gas, the heat exchanger being configured to at least partially confine the portion of the body of water from which heat is transferred, the method further including separating the fresh water ice from the body of water portion.

8. The method as in claim 2, wherein the flowing of the liquefied energy-containing gas includes pumping the fluid from the source at a pressurized state, the method further including adjusting the pressurized state of the liquified liquefied energy-containing gas prior to pumping, the pressurized state adjusting being in accordance with an amount of heat to be transferred to the flowing liquified liquefied energy-containing gas from the body of water.

9. The method as in claim 1, further including securing the gas containment structure to the floor of the body of water against the buoyancy forces of the contained gas.

10. a. System for storing energy in fluid form comprising:
a, a fluid containment structure having an interior defined by a top, one or more sides, and a bottom, the fluid containment structure being configured to be operable when filled with fluid while submerged beneath a surface of a body of water at a preselected distance from a floor of the body of water;
b. passage means adjacent the structure bottom for providing flow communication between, the structure interior and the body of water;
c. conduit means operatively connected to the containment structure for providing flow communication between a source of an energy-containing fluid at/or adjacent the surface of the body of water and the structure interior, the flow of the energy-containing fluid entering the containment structure displacing an equivalent volume of water through the passage means; and
d. pumping means for providing a flow of the energy-containing fluid into the containment structure interior against a back pressure essentially equal to the static pressure of the body of water at the preselected distance;
e. the energy containing fluid source is a source of a liquefied gas, and wherein the system includes heat transfer means for transferring a quantity of heat from the body of water to the flowing liquefied gas sufficient to vaporize substantially all the flowing liquefied gas prior to entry into the containment structure interior.

11. The system as in claim 10, including means for maintaining the location of the containment structure at the predetermined distance against the buoyancy force on the containment structure due to the stored energy-containing fluid.

12. The system as in claim 10, wherein the passage means includes one or more openings in the structure bottom and/or in one or more of the structure sides adjacent to the bottom.

13. The system as in claim 10, wherein the conduit means includes a conduit extending between the containment structure top and the source located at or adjacent the surface of the body of water.

14. The system as in claim 10, wherein the source of the energy-containing fluid is a source of liquefied gas, and wherein the conduit is configured for transferring an amount of heat from the body of water to the liquefied gas.

15. The system as in claim 10, wherein the body of water is a body of sea water; wherein the heat transfer means includes a heat exchanger positioned adjacent the surface of the body of water; and wherein means are provided for recovering fresh water ice from a portion of the body of sea water from which heat is transferred to the flowing liquefied gas.

16. The system as in claim 10, wherein the heat transfer means includes a heat exchanger located adjacent the bottom of the containment vessel, and wherein the heat exchanger is configured to provide at least a part of a restraining force to the containment structure against a buoyancy force of the gas stored in the containment structure interior to maintain the preselected distance.

17. The system as in claim 10, wherein the pumping means includes means for adjusting a pressurized state of the liquefied gas in accordance with the amount, of heat to be transferred to the flowing liquefied gas.

18. The system as in claim 10, wherein the energy containing fluid is a gas, and wherein the pumping means includes one or more leveraged reciprocating piston and cylinder assemblies positioned proximate the container structure bottom for compressing the energy-containing gas received from the source at the surface.

19. The system as in claim 10, wherein the energy containing fluid is a gas, and wherein the pumping means includes one or more jet pumps and piston-less pressure cylinders located proximate the container structure bottom for compressing the energy-containing gas received from the source at the surface.

20. The system as in claim 10, wherein the pumping means is supplied with energy for pumping from one or more renewable energy resources selected from the group of wind turbines, solar panel arrays, ocean wave power generators, and water turbines.

21. Method for producing and storing hydrogen gas comprising:
a. providing a gas containment structure having an interior defined by a top, one or more sides, and a bottom;
b. positioning the containment structure below a surface of a body of sea water, the structure being configured for sea water flow communication between the body of sea water and the structure interior at a location adjacent the structure bottom;
c. selecting a material reactive with sea water to produce hydrogen gas;
d. transporting the material to the interior of the structure proximate the structure bottom while preventing substantial contact between the body of sea water and the reactive material before reaching the structure interior;
e. evolving hydrogen gas within the structure interior by reacting the reactive material with sea water; and f. displacing a volume of sea water from the containment structure interior substantially equivalent to that of the evolved hydrogen gas.

22. The method as in claim 21, wherein the selected reactive material also chemically binds oxygen evolved in the hydrogen as generating reaction, whereby substantially no oxygen gas is evolved within the containment structure interior.

23. The method of claim 21, wherein the selected reactive material has exposed surfaces and comprises of Aluminum or an alloy of Aluminum, the exposed surfaces of which are coated with a reaction promoter.

24. The method of claim 23, wherein the reaction promoter includes Galinstan.

25. The method as in claim 21, wherein the selected reactive material is transported from the surface to the containment structure interior in a container via a cable system extending through the containment structure bottom.

26. Apparatus for storing and retrieving fresh water beneath a body of salt water or brackish water, the apparatus comprising:
   a. a fluid containment structure having an interior defined by a top, one or more sides, and a bottom, the fluid containment structure being configured to be operable when filled with fresh water while submerged beneath a surface of a body of salt water or brackish water at a preselected distance from a floor of the body of water;
   b. one or more openings in the structure adjacent the structure bottom for providing flow communication between the structure interior and the body of salt water or brackish water;
   c. one or more conduits operatively connected to the top of the containment structure for providing flow communication between a source of fresh water at/or adjacent the surface of the body of salt water or brackish water and the structure interior, the flow of the fresh water entering the containment structure displacing an equivalent volume of salt water or brackish water through the one or more openings; and
   d. a flexible bladder or impermeable membrane positioned within the structure between the top and the bottom of the structure and above the one or more openings, the bladder or membrane being configured to separate the fresh water stored in the structure interior adjacent the top of the structure from the sea water or brackish water adjacent the bottom of the structure; and
   e. a pump for providing a flow of the fresh water through the conduits and through the top of the containment structure into the interior for storage.

27. The apparatus in claim 26, including means for maintaining the location of the containment structure at the predetermined distance against the buoyancy force on the containment structure due to the stored fresh water.

28. The apparatus as in claim 26, wherein the containment structure includes a plurality of interconnected storage tanks.

29. The apparatus as in claim 26, wherein at least one of the one or more conduits is configured for retrieving the stored fresh water from the structure interior.

30. The apparatus as in claim 26, wherein the pump uses electric power, and wherein at least a portion of the electric power used by the pump is generated by non-fossil fuel electric power generators.

31. The system as in claim 10, wherein the containment structure includes a plurality of interconnected storage tanks.

\* \* \* \* \*

UNITED STATES PATENT AND TRADEMARK OFFICE
CERTIFICATE OF CORRECTION

PATENT NO. : 9,045,209 B2  
APPLICATION NO. : 13/802912  
DATED : June 2, 2015  
INVENTOR(S) : Fevzi Zeren et al.

Page 1 of 1

It is certified that error appears in the above-identified patent and that said Letters Patent is hereby corrected as shown below:

In the claims,

Claim 10: Col. 19, Line 42, "a System" should read --System--.

Claim 10: Col. 19, Line 43, "a, a" should read --a. a--.

Claim 10: The text in col. 19, lines 43-47 should be indented to align with the remaining text in col. 19, lines 48-67.

Claim 17: Col. 20, Line 32, "amount, of" should read --amount of--.

Signed and Sealed this
Twenty-ninth Day of March, 2016

Michelle K. Lee
*Director of the United States Patent and Trademark Office*